(12) United States Patent
Maejima

(10) Patent No.: US 11,312,464 B2
(45) Date of Patent: *Apr. 26, 2022

(54) VESSEL POWER SUPPLY SYSTEM

(71) Applicant: YAMAHA HATSUDOKI KABUSHIKI KAISHA, Iwata (JP)

(72) Inventor: Masaki Maejima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,347

(22) Filed: Apr. 23, 2019

(65) Prior Publication Data

US 2019/0248461 A1 Aug. 15, 2019

Related U.S. Application Data

(63) Continuation of application No. 15/484,360, filed on Apr. 11, 2017, now Pat. No. 1,030,999.

(30) Foreign Application Priority Data

Apr. 12, 2016 (JP) .................. 2016-079850

(51) Int. Cl.
*B60L 50/15* (2019.01)
*B63H 21/21* (2006.01)
(Continued)

(52) U.S. Cl.
CPC .............. *B63H 21/21* (2013.01); *B60L 50/15* (2019.02); *B63H 21/14* (2013.01); *B63H 21/20* (2013.01);
(Continued)

(58) Field of Classification Search
CPC ........ B63H 21/21; B63H 21/14; B63H 21/20; B63H 2021/216; B63H 2021/205;
(Continued)

(56) References Cited

U.S. PATENT DOCUMENTS

2012/0049771 A1* 3/2012 Komatsu .................. B60L 1/003
318/139
2014/0265558 A1 9/2014 Katayama et al.
(Continued)

FOREIGN PATENT DOCUMENTS

JP 2000-043795 A 2/2000
JP 2003-081191 A 3/2003
(Continued)

OTHER PUBLICATIONS

Maejima, "Vessel Power Supply System", U.S. Appl. No. 15/484,360, filed Apr. 11, 2017.

*Primary Examiner* — Daniel Kessie
(74) *Attorney, Agent, or Firm* — Keating and Bennett, LLP

(57) ABSTRACT

A vessel power supply system for a vessel including a propulsion device that includes an engine and a generator driven by the engine to generate electricity, includes a first battery that supplies power to the propulsion device, a second battery that supplies power to accessories of the vessel, a first open circuit voltage sensor that detects an open circuit voltage of the first battery, a second open circuit voltage sensor that detects an open circuit voltage of the second battery, and a switch that is turned on/off to open and close a current path between the first battery and the second battery.

11 Claims, 9 Drawing Sheets

(51) Int. Cl.
*H02J 7/14* (2006.01)
*B63H 21/14* (2006.01)
*B63H 21/20* (2006.01)
*B63J 3/02* (2006.01)

(52) U.S. Cl.
CPC .............. *B63J 3/02* (2013.01); *H02J 7/1423* (2013.01); *H02J 7/1461* (2013.01); *H02J 7/1469* (2013.01); *B60L 2200/32* (2013.01); *B63H 2021/205* (2013.01); *B63H 2021/216* (2013.01); *Y02T 10/70* (2013.01); *Y02T 10/7072* (2013.01); *Y10S 903/903* (2013.01)

(58) Field of Classification Search
CPC ....... H02J 7/1461; H02J 7/1469; B60L 11/12; B60L 2200/32; B63J 3/02; B63B 2758/00; Y10S 903/903
See application file for complete search history.

(56) References Cited

U.S. PATENT DOCUMENTS

| | | | |
|---|---|---|---|
| 2015/0008731 A1* | 1/2015 | Takahashi | F02N 11/0866 |
| | | | 307/9.1 |
| 2017/0141589 A1* | 5/2017 | Inoue | H02J 7/0014 |
| 2019/0013664 A1* | 1/2019 | Yasunori | B60R 16/03 |
| 2019/0103629 A1* | 4/2019 | Koike | H01M 10/0525 |

FOREIGN PATENT DOCUMENTS

| | | |
|---|---|---|
| JP | 2004-260905 A | 9/2004 |
| JP | 2012-254691 A | 12/2012 |
| JP | 2014-177213 A | 9/2014 |
| JP | 2015-211576 A | 11/2015 |

\* cited by examiner

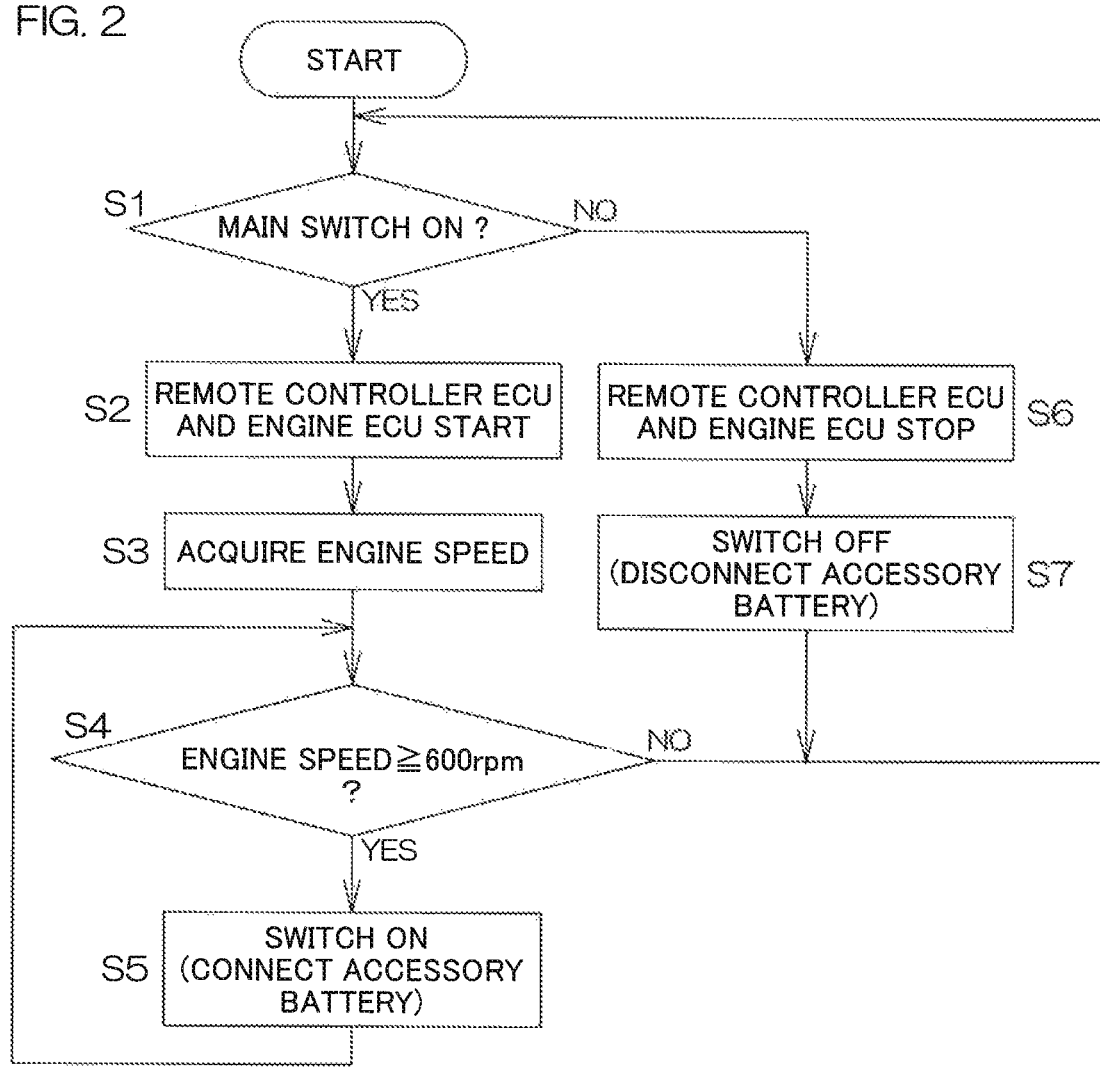

VESSEL POWER SUPPLY SYSTEM

BACKGROUND OF THE INVENTION

1. Field of the Invention

The present invention relates to a power supply system for a vessel including a propulsion device that includes an engine and a generator that generates electricity using the engine.

2. Description of the Related Art

A vessel propulsion device with an engine (internal combustion engine) as a drive source includes a starter motor that starts the engine and a generator that is driven by the engine. The vessel propulsion device is connected to a battery located within a hull. The starter motor is operated using electric power supplied from the battery to crank the engine. Electric power generated by the generator is used to charge the battery.

Electric power stored in the battery is used not only to drive the starter motor but also to operate of various riggings and other electrical components included in the vessel. When the engine is stopped during, for example, anchoring, the battery is not charged, so that using the electrical components causes the remaining battery level to decrease. Accordingly, consuming a lot of electric power may cause the remaining battery level to decrease to a level at which the driving of the starter motor may possibly be impacted.

Hence, in US 2003/0076071A1, the remaining battery level is monitored and, when the remaining battery level decreases when the engine is stopped, a user restarts the engine before the starter motor becomes undrivable to resume charging the battery.

SUMMARY OF THE INVENTION

The inventor of preferred embodiments of the present invention described and claimed in the present application conducted an extensive study and research regarding vessel power supply systems, such as the one described above, and in doing so, discovered and first recognized new unique challenges and previously unrecognized possibilities for improvements as described in greater detail below.

In US 2003/0076071A1, when the remaining battery level falls below a predetermined value, an alarm is raised to urge a user to restart the engine to prevent the remaining battery level from further decreasing.

In order to perform such an alarm operation adequately, it is necessary to accurately detect the remaining battery level.

In US 2003/0076071A1, the current flowing into/out of the battery is integrated and, based on the integrated value, the remaining battery level is obtained.

However, just integrating the charge and discharge current may not necessarily allow the remaining battery level to be obtained accurately. This is because long-term current accumulation may cause an accumulative error.

As a remaining battery level estimation that does not suffer from such an accumulative error, there has been known an approach employing OCV (Open Circuit Voltage). OCV is an open circuit voltage (open voltage) when the battery is not under load and in equilibrium. Since there is a correlation between OCV and SOC (State Of Charge or ratio of charge), obtaining an OCV allows an SOC to be obtained, and the SOC is able to provide an indicator of the remaining battery level. SOC during operation is able to be obtained by integrating the current balance constantly and integrating the change in SOC accordingly.

OCV detection requires the battery to be held in a not under load condition (or a condition of extremely low current load) over several hours. That is, it is necessary to ensure a condition in which little current flows into/out of the battery.

A vessel is often equipped with multiple batteries and the batteries are often connected in parallel. Specifically, one or more batteries that start a propulsion device (to drive a starter motor) and one or more batteries that supply power to electrical components (accessories) such as riggings may be included and the batteries may be connected and used in parallel. The multiple batteries remain connected in parallel even during storage (anchoring). For this reason, even if an attempt is made to measure the OCV of each battery, it cannot be obtained accurately due to the influence from other batteries. This makes it impossible to obtain an accurate SOC.

Hence, a preferred embodiment of the present invention provides a vessel power supply system that is able to obtain a battery level accurately even when the vessel is equipped with multiple batteries.

In order to overcome the previously unrecognized and unsolved challenges described above, a preferred embodiment of the present invention provides a vessel power supply system for a vessel including a propulsion device that includes an engine and a generator that is driven by the engine to generate electricity. The vessel power supply system includes a first battery that supplies power to the propulsion device, a second battery that supplies power to accessories of the vessel, a first open circuit voltage sensor that detects an open circuit voltage of the first battery, a second open circuit voltage sensor that detects an open circuit voltage of the second battery, and a switch including a first switch that is turned on/off to open and close a current path between the first battery and the second battery.

In accordance with the arrangement described above, turning the first switch off causes the current path between the first battery and the second battery to be opened, which allows the first battery and the second battery to be disconnected. In this state, the first open circuit voltage sensor is able to detect the open circuit voltage of the first battery accurately without being impacted by the second battery. The second open circuit voltage sensor is also able to detect the open circuit voltage of the second battery accurately without being impacted by the first battery. It is therefore possible to obtain the remaining battery level of each of the first battery and the second battery accurately by using output signals from the first open circuit voltage sensor and the second open circuit voltage sensor.

In a preferred embodiment of the present invention, the second battery is connected via the current path to the propulsion device, and the first switch is turned on/off to connect/disconnect the second battery and the propulsion device. With this arrangement, turning the first switch on allows the second battery to be connected in parallel with the propulsion device. This allows the second battery to power the propulsion device.

In a preferred embodiment of the present invention, the vessel power supply system further includes a switch controller that is configured or programmed to control the switch. With this arrangement, the switch is able to undergo automatic switching, which makes it possible to obtain the remaining battery levels of the first and second batteries reliably and accurately.

In a preferred embodiment of the present invention, the vessel power supply system further includes a main switch that is turned on by a user to power the propulsion device and to be turned off by the user to stop power to the propulsion device. The switch controller turns the first switch off when the main switch is turned off.

With the arrangement described above, the first switch is turned off automatically when the main switch is turned off. This allows the first and second batteries to be disconnected reliably when the vessel is not used. It is therefore possible, when the vessel is not used, to detect the open circuit voltage of the first and second batteries accurately and thus obtain the remaining battery levels of the batteries reliably and accurately.

In a preferred embodiment of the present invention, the vessel power supply system further includes a start determining processor configured or programmed to determine whether the engine of the propulsion device has started. The switch controller turns the first switch on when the main switch is turned on and the start determining processor determines that the engine has started. With this arrangement, when the engine has started, the first switch is turned on automatically to connect the second battery to the propulsion device. It is therefore possible, when the vessel is used, particularly after the engine is started, to use electric power from the second battery at the propulsion device. It is also possible to charge the second battery with electric power generated by the generator driven by the engine. During the starting operation of the engine, the second battery is disconnected from the propulsion device, which prevents electric power from the second battery from being used to start the engine.

In a preferred embodiment of the present invention, the start determining processor determines whether the engine has started using the rotational speed of the engine or the circuit voltage within the propulsion device. With this arrangement, it is possible to reliably determine that the engine has started and thus turn on/off the first switch adequately, which makes it possible to control connection/disconnection between the first battery and the second battery adequately.

In a preferred embodiment of the present invention, the vessel power supply system further includes a first storage that stores a first open circuit voltage detected by the first open circuit voltage sensor when the first switch is in an off state, and a second storage that stores a second open circuit voltage detected by the second open circuit voltage sensor when the first switch is in an off state. In accordance with this arrangement, the first and second open circuit voltages are stored in the respective first and second storages, which are detected when the first switch is in an off state, that is, the first and second batteries are disconnected. The first and second storages are therefore each stored with an open circuit voltage detected under a condition where the first and second batteries do not impact each other. It is therefore possible to obtain the remaining battery levels of each of the first and second batteries accurately using the first and second open circuit voltages stored in the respective first and second storages.

In a preferred embodiment of the present invention, the vessel power supply system further includes a first battery remaining level calculator that calculates a first battery remaining level of the first battery according to the first open circuit voltage stored in the first storage and an integrated value of the current flowing into/out of the first battery, and a second battery remaining level calculator that calculates a second battery remaining level of the second battery according to the second open circuit voltage stored in the second storage and an integrated value of the current flowing into/out of the second battery. With this arrangement, the first and second battery remaining level calculators are able to calculate the remaining battery levels of the respective first and second batteries accurately.

In a preferred embodiment of the present invention, the vessel power supply system further includes a charging circuit that charges the first battery and the second battery with electric power generated by the generator. When the first switch is on and once the first battery remaining level calculated by the first battery remaining level calculator becomes lower than a first threshold value, the first switch is turned off. Thus, once the remaining level of the first battery decreases to be lower than the first threshold value, the first switch is turned off to disconnect the second battery from the propulsion device. This causes the charging circuit not to charge the second battery but to charge the first battery. It is therefore possible to charge the first battery for the propulsion device preferentially and to surely power the propulsion device to keep the propulsion device in an operable state. Since the remaining battery level is obtained accurately, the charge control for the first and second batteries is performed adequately.

In a preferred embodiment of the present invention, when the first switch is off and once the first battery remaining level calculated by the first battery remaining level calculator exceeds a second threshold value that is equal to or higher than the first threshold value, the first switch is turned on. In accordance with this arrangement, once the first battery is charged sufficiently and the remaining level exceeds the second threshold value, the first switch is turned on. This starts charging the second battery after the first battery is fully charged. It is thus possible to charge the second battery while preferentially charging the first battery. Since the remaining battery level is obtained accurately, the charge control for the first and second batteries is able to be performed adequately.

The second threshold value may be equal to the first threshold value. The second threshold value may also be higher than the first threshold value. In this case, the first switch is turned on/off hysteretically with respect to the remaining level of the first battery. This allows the charge control for the first and second batteries to be performed adequately while preventing the first switch from being turned on/off frequently.

In a preferred embodiment of the present invention, the vessel power supply system further includes a charge limiter that limits the charging operation by the charging circuit when the first battery remaining level calculated by the first battery remaining level calculator is equal to or higher than a third threshold value that is equal to or higher than the first threshold value and the second battery remaining level calculated by the second battery remaining level calculator is equal to or higher than a fourth threshold value.

In accordance with the arrangement described above, when both the first and second batteries are charged sufficiently, the charging operation by the charging circuit is limited. This prevents the first and second batteries from being overcharged. Since the remaining battery levels of both the first and second batteries are obtained accurately, the charge limiting control is performed adequately.

In a preferred embodiment of the present invention, the switch further includes a second switch that is turned on/off to connect/disconnect the first battery and the propulsion device. In accordance with this arrangement, not only the second battery but also the first battery is disconnected from the propulsion device. This allows the first battery to be not under load reliably, which makes it possible to detect the open circuit voltage of the first battery more accurately. This allows the accuracy in calculating the remaining battery level of the first battery to be improved.

In a preferred embodiment of the present invention, the vessel power supply system further includes a second switch that is turned on/off to connect/disconnect the first battery and the propulsion device. Then, once the first battery remaining level calculated by the first battery remaining level calculator exceeds a second threshold value that is equal to or higher than the first threshold value, the first switch is turned on and the second switch is turned off.

In accordance with the arrangement described above, once the first battery is charged sufficiently, the first battery is disconnected from the propulsion device, while the second battery is connected to the propulsion device. This causes the second battery to be supplied exclusively with electric power generated by the generator and charged. That is, the first battery is charged preferentially with only the first battery being connected to the propulsion device, and thereafter the first battery is disconnected from the propulsion device and the second battery is charged. After the first battery is thus charged preferentially and sufficiently, the second battery is then charged immediately. Since the remaining level of the first battery is obtained accurately, the on/off control for the first and second switches is performed adequately based on the remaining battery level.

In a preferred embodiment of the present invention, the vessel power supply system further includes a charge limiter that limits the charging operation by the charging circuit when the first battery remaining level calculated by the first battery remaining level calculator is equal to or higher than a third threshold value that is equal to or higher than the first threshold value and the second battery remaining level calculated by the second battery remaining level calculator is equal to or higher than a fourth threshold value.

With the arrangement described above, when both the first and second batteries are charged sufficiently, the charging operation is limited and the first and second batteries are prevented from being overcharged. Since the remaining battery levels of the first and second batteries are obtained accurately, the charge limiting control is performed adequately.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a flowchart showing control of a switch performed to measure an open circuit voltage of a battery accurately.

DETAILED DESCRIPTION OF THE PREFERRED EMBODIMENTS

Figure 1A:
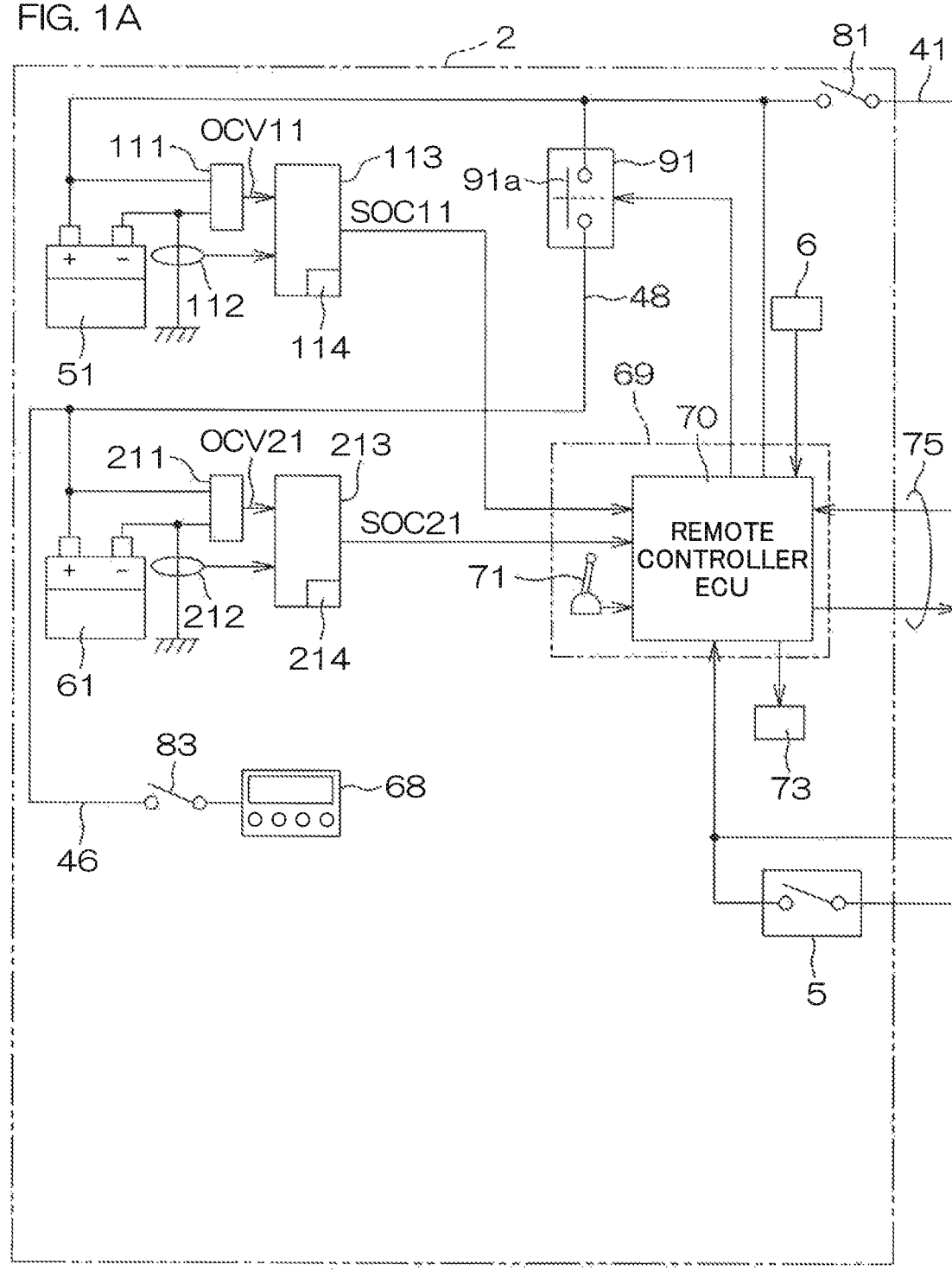
FIGS. 1A and 1B are block diagrams illustrating the configuration of a power supply system of a vessel according to a preferred embodiment of the present invention.
Figure 1B:
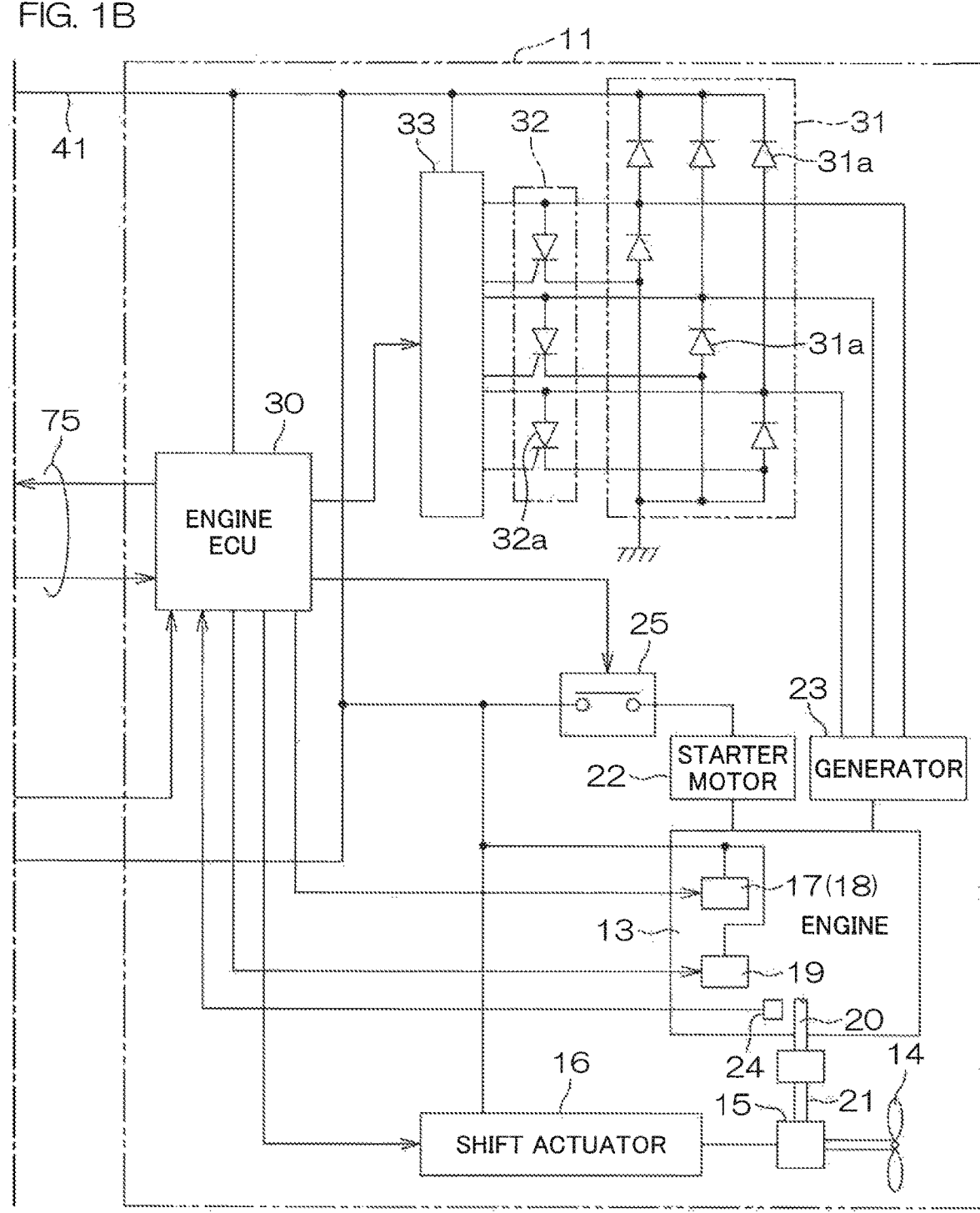

FIGS. 1A and 1B are block diagrams illustrating the configuration of a power supply system of a vessel according to a preferred embodiment of the present invention. FIGS. 1A and 1B can be combined side by side with the alternate long and short dashed lines overlapping each other to form one block diagram. The vessel 1 includes a hull 2 and a propulsion device 11 installed on the hull 2. The propulsion device 11 may be, for example, an outboard motor. The propulsion device 11 includes an engine (internal combustion engine) 13, a propeller 14 to be driven by the engine 13, and a shift mechanism 15 in a power transmitting path from the engine 13 to the propeller 14. The shift mechanism 15 transmits a drive force in which one of multiple shift positions is able to be selected. The multiple shift positions include a forward drive shift position at which the rotation of the engine 13 is transmitted to the propeller 14 to be rotated in one direction (forward drive direction), a reverse drive shift position at which the rotation of the engine 13 is transmitted to the propeller 14 to be rotated in the other direction (reverse drive direction), and a neutral shift position at which the rotation of the engine 13 is not transmitted to the propeller 14. At the forward drive shift position, the propeller 14 generates a propulsive force in the forward drive direction to move the hull 2 forward. At the reverse drive shift position, the propeller 14 generates a propulsive force in the reverse drive direction to move the hull 2 rearward. At the neutral shift position, the propeller 14 generates no propulsive force. In the present preferred embodiment, the shift mechanism 15 is actuated by a shift actuator 16 and controlled to have one of the multiple shift positions.

In the present preferred embodiment, the engine 13 includes an electronically-controlled throttle device 17 and a fuel injection valve 19. The electronically-controlled throttle device 17 includes a throttle actuator 18 that changes the throttle opening degree of the engine 13. When the throttle actuator 18 is driven, the output of the engine 13 (more specifically, the engine speed) changes. In addition, controlling the amount of fuel injection using the fuel injection valve 19 allows the output of the engine 13 (more specifically, the engine speed) to be changed. The engine 13 includes a crankshaft 20 and the crankshaft 20 is coupled via a drive shaft 21 to the shift mechanism 15. The crankshaft 20 is coupled with a starter motor 22 and a generator 23. The starter motor 22 rotates the crankshaft 20 when starting the engine. The generator 23 is driven by the engine 13 to generate electric power.

The propulsion device 11 further includes an engine ECU (Electronic Control Unit) 30. The engine ECU 30 is configured or programmed to control the shift actuator 16, the throttle actuator 19, the fuel injection valve 19, etc. A detection signal from a crank sensor 24 that detects rotational information of the crankshaft 20 is input to the engine ECU 30. This allows the engine ECU 30 to obtain an engine speed.

The propulsion device 11 further includes a charging circuit 31, a regulation circuit 32, and a regulation controlling circuit 33. The charging circuit 31 includes a rectifying circuit that converts alternating-current power generated by the generator 23 into direct current and supplies the converted power into a power line 41. The regulation circuit 32 is connected to the charging circuit 31 to limit charging. More specifically, the charging circuit 31 includes multiple diodes 31a connected between the generator 23 and the power line 41 to define a diode bridge (rectifying circuit), while the regulation circuit 32 includes multiple thyristors 32a connected in parallel with the diodes 31a. The generator 23 is, for example, a three-phase alternating-current generator. When the multiple thyristors 32a are turned on simultaneously, the generator 23 is short-circuited and the charging function of the charging circuit 31 is disabled. That is, a charge inhibition state occurs. The regulation controlling circuit 33 turns the thyristors 32a on/off. The regulation controlling circuit 33 is controlled by the engine ECU 30. When a charge inhibition condition is met, the engine ECU 30 inputs a regulation control command to the regulation controlling circuit 33. The regulation controlling circuit 33, when the regulation control command is input thereto, turns the thyristors 32a on to inhibit charging. The regulation controlling circuit 33 also monitors the voltage of the power line 41 and, when the voltage reaches a predetermined limit voltage, turns the thyristors 32a on to operate in a manner to prevent overcharging.

The power line 41 is connected with the shift actuator 16, the throttle actuator 18, the fuel injection valve 19, the starter motor 22, the engine ECU 30, the charging circuit 31, the regulation controlling circuit 33, etc. The starter motor 22 is connected via a starter relay 25 to the power line 41. The starter relay 25 is turned on/off by the engine ECU 30. When the starter relay 25 is turned on, the starter motor 22 is powered and driven to rotate the crankshaft 20.

The hull 2 is equipped with a propulsion device battery 51, an accessory battery 61, a remote controller 69, navigational equipment 68, etc. The propulsion device battery 51 is connected via the power line 41 to the propulsion device 11. A battery switch 81 to be operated manually by a user is interposed in the power line 41. The accessory battery 61 is connected to the power line 41 between the battery switch 81 and the propulsion device battery 51. A switch 91 is interposed in a current path 48 between the accessory battery 61 and the power line 41. The switch 91 includes one switch 91a (as an example of a first switch) that is turned on/off by a remote controller ECU (Electronic Control Unit) 70 included in the remote controller 69, such that the accessory battery 61 and the power line 41 are connected to/disconnected from each other. The switch 91a may be a semiconductor switch, for example. When the battery switch 81 is in an ON state and the switch 91 is in an ON state (i.e., the switch 91a is in an ON state), the propulsion device battery 51 and the accessory battery 61 are connected in parallel with respect to the propulsion device 11.

The remote controller 69 includes the remote controller ECU 70. The remote controller ECU 70 is connected to the power line 41 at a position closer to the propulsion device battery 51 than the battery switch 81. The remote controller 69 includes a control lever 71 to be operated by a driver to shift and control power to the propulsion device 11. A control signal from the control lever 71 is input to the remote controller ECU 70. The remote controller ECU 70 is connected through a signal line 75 to the engine ECU 30. The signal line 75 may be a local area network (inboard LAN), for example. The remote controller ECU 70 generates a shift command signal and a power command signal according to an operation on the control lever 71. The engine ECU 30 is configured or programmed to control the shift actuator 16 according to the shift command signal and control the throttle actuator 18 according to the power command signal. Thus, operating the control lever 71 allows a shift position of the propulsion device 11 (a state of the shift mechanism 15) to be selected and the throttle opening degree (i.e., output power of the engine 13) to be adjusted.

The engine ECU 30 provides an engine speed signal via the signal line 75 to the remote controller ECU 70. The remote controller ECU 70 is configured or programmed to determine whether the engine 13 operates (starts) based on the engine speed signal. The remote controller ECU 70 may determine whether the engine 13 operates (starts) based on the voltage of the power line 41, that is, based on the circuit voltage within the propulsion device 11. The remote controller ECU 70 also provides, via the signal line 75 to the engine ECU 30, a regulation permission signal indicating whether to allow regulation (inhibition of charging operation) of the charging circuit 31. The engine ECU 30 issues a regulation control command to the regulation controlling circuit 33 to provide a charge inhibition state, provided that the regulation permission signal allows for regulation.

The remote controller ECU 70 is connected with an indicator 73 that indicates the engine speed and various alarms. The remote controller ECU 70 provides an indication control signal to the indicator 73, according to which an indicative operation is performed on the indicator 73.

The remote controller ECU 70 is further connected with a main switch 5. The main switch 5 is connected to the power line 41 at a position closer to the propulsion device 11 than the battery switch 81. The main switch 5 is operated by the user to supply power to the propulsion device 11 after the battery switch 81 is turned on. When the main switch 5 is turned on, the remote controller ECU 70 and the engine ECU 30 are activated. The remote controller ECU 70 is further connected with a starter switch 6 to be operated by the user to start the engine 13. When a start command is provided from the starter switch 6, the remote controller ECU 70 provides an engine start command via the signal line 75 to the engine ECU 30. In response to this, the engine ECU 30 performs start control. The start control includes turning the starter relay 25 on and starting a fuel injection operation by the fuel injection valve 19. When the use of the propulsion device 11 is terminated, the user turns the main switch 5 off to stop power to the propulsion device 11 and thus stop the engine 13.

The propulsion device battery 51 mainly supplies electric power to be used in the propulsion device 11. More specifically, the propulsion device battery 51 is a power source included in the vessel 1 with the main function (purpose) of powering the starter motor 22 when starting the engine 13. On the other hand, the accessory battery 61 is a power source included in the vessel 1 with the main function (purpose) of powering the electrical components included in the vessel 1 other than the propulsion device 11, that is, the accessories. An example of the accessories is navigational equipment 68 such as fish sonar. A battery switch 83 is interposed in a power line 46 between the navigational equipment 68 and the accessory battery 61. Both the propulsion device battery 51 and the accessory battery 61 are secondary batteries charged with electric power supplied via the power line 41 from the propulsion device 11 during operation of the engine 13.

The propulsion device battery 51 is connected with an OCV sensor 111. Similarly, the accessory battery 61 is connected with an OCV sensor 211. The OCV sensor 111 detects the open circuit voltage (OCV) of the propulsion device battery 51. The OCV sensor 211 detects the open circuit voltage of the accessory battery 61. In association with the propulsion device battery 51, a current sensor 112 is further provided to detect the current flowing into/out of the propulsion device battery 51. Similarly, in association with the accessory battery 61, a current sensor 212 detects the current flowing into/out of the accessory battery 61. An output signal from the OCV sensor 111 and an output signal from the current sensor 112 are input to a propulsion device battery remaining level computing processor 113. Similarly, an output signal from the OCV sensor 211 and an output signal from the current sensor 212 are input to an accessory battery remaining level computing processor 213.

The propulsion device battery remaining level computing processor 113 monitors an output signal from the current sensor 112 to determine that the propulsion device battery 51 is not under load and in equilibrium when the current flowing into/out of the propulsion device battery 51 is considered to be zero or substantially zero for a predetermined period of time or longer. The propulsion device battery remaining level computing processor 113 then, when the propulsion device battery 51 is not under load and in equilibrium, acquires an output signal (open circuit voltage) OCV11 from the OCV sensor 111 at predetermined time intervals (e.g., every four hours) and stores it in the memory 114. The memory 114 may be provided internally or externally to the propulsion device battery remaining level computing processor 113. The propulsion device battery remaining level computing processor 113, when the open circuit voltage OCV11 within the memory 114 is updated, obtains an initial remaining battery level SOC11 (0) of the propulsion device battery 51 based on the updated open circuit voltage OCV11. The propulsion device battery remaining level computing processor 113 thus, when the propulsion device battery 51 is not under load and in equilibrium, obtains the initial remaining battery level SOC11 (0) at predetermined time intervals (e.g., every four hours). "Initial remaining battery level" is an initial value of the remaining battery level at the time of the next connection of a load to the battery. Since there is a predetermined correlation between the open circuit voltage (OCV) and the remaining battery level (e.g., SOC: State Of Charge), the initial remaining battery level SOC11 (0) is obtained based on the correlation. For example, OCV-SOC property data for the propulsion device battery 51, which indicates a correlative property between the open circuit voltage and the remaining battery level, is stored in the memory 114. The propulsion device battery remaining level computing processor 113 is able to refer to the OCV-SOC property data to obtain the initial remaining battery level SOC11 (0) corresponding to the open circuit voltage OCV11. The obtained initial remaining battery level SOC11 (0) is stored in the memory 114.

The propulsion device battery remaining level computing processor 113, when some current flows into/out of the propulsion device battery 51, computes and outputs a remaining level SOC11 of the propulsion device battery 51 at predetermined time intervals (e.g., every one second) based on the initial remaining battery level SOC11 (0) and a current detected by the current sensor 112. For example, the propulsion device battery remaining level computing processor 113 applies a negative sign to the current (consumption current) in the direction flowing out of the propulsion device battery 51, while applying a positive sign to the current (charging current) in the direction flowing into the propulsion device battery 51 to obtain a variate ΔSOC11 in the remaining battery level corresponding to the current. The propulsion device battery remaining level computing processor 113 integrates the variate ΔSOC11 with respect to the initial remaining battery level SOC11 (0) to obtain the remaining battery level SOC11. Thus, computing the remaining battery level SOC11 includes nothing other than obtaining the remaining level SOC11 of the propulsion device battery 51 based on the initial remaining battery level SOC11 (0) and an integrated value of the current flowing into/out of the propulsion device battery 51.

Similarly, the accessory battery remaining level computing processor 213 monitors an output signal from the current sensor 212 to determine that the accessory battery 61 is not under load and in equilibrium when the current flowing into/out of the accessory battery 61 is considered to be zero or substantially zero for a predetermined period of time or longer. The accessory battery remaining level computing processor 213 then, when the accessory battery 61 is not under load and in equilibrium, acquires an output signal (open circuit voltage) OCV21 from the OCV sensor 211 at predetermined time intervals (e.g., every four hours) and stores it in the memory 214. The memory 214 may be provided internally or externally to the accessory battery remaining level computing processor 213. The accessory battery remaining level computing processor 213, when the open circuit voltage OCV21 within the memory 214 is updated, obtains an initial remaining battery level SOC21 (0) of the accessory battery 61 based on the updated open circuit voltage OCV21. The accessory battery remaining level computing processor 213 thus, when the accessory battery 61 is not under load and in equilibrium, obtains the initial remaining battery level SOC21 (0) at predetermined time intervals (e.g., every four hours). For example, OCV-SOC property data for the accessory battery 61, which indicates a correlative property between the open circuit voltage and the remaining battery level, is stored in the memory 214. The accessory battery remaining level computing processor 213 is able to refer to the OCV-SOC property data to obtain the initial remaining battery level SOC21 (0) corresponding to the open circuit voltage OCV21. The obtained initial remaining battery level SOC21 (0) is stored in the memory 214.

The accessory battery remaining level computing processor 213, when some current flows into/out of the accessory battery 61, computes and outputs a remaining battery level SOC21 of the accessory battery 61 at predetermined time intervals (e.g., every one second) based on the initial remaining battery level SOC21 (0) and a current detected by the current sensor 212. For example, the accessory battery remaining level computing processor 213 applies a negative sign to the current (consumption current) in the direction flowing out of the accessory battery 61, while applying a positive sign to the current (charging current) in the direction flowing into the accessory battery 61 to obtain a variate ΔSOC21 in the remaining battery level corresponding to the current. The accessory battery remaining level computing processor 213 integrates the variate ΔSOC21 with respect to the initial remaining battery level SOC21 (0) to obtain the remaining battery level SOC21. Thus, computing the remaining battery level SOC21 includes nothing other than obtaining the remaining battery level SOC21 of the accessory battery 61 based on the initial remaining battery level SOC21 (0) and an integrated value of the current flowing into/out of the accessory battery 61.

The remaining battery levels SOC11, SOC21 computed by the battery remaining level computing processors 113, 213 are input to the remote controller ECU 70. The remaining battery levels SOC11, SOC21 may be shown by the indicator 73.

The OCV sensor 111, the current sensor 112, the propulsion device battery remaining level computing processor 113, and the memory 114 may be integrated as a propulsion device battery module together with the propulsion device battery 51. Similarly, the OCV sensor 211, the current sensor 212, the battery remaining level computing processor 213, and the memory 214 may be integrated as an accessory battery module together with the accessory battery 61. In this case, the switch 91 may be an external switch provided externally to the modules.

FIG. 2 is a flowchart for control of the switch 91 performed to measure an open circuit voltage accurately using the OCV sensors 111, 211, mainly illustrating processes performed by the remote controller ECU 70. The switch 91 is initially in an OFF state.

The remote controller ECU 70 determines whether the main switch 5 is in an ON state (Step S1). Upon starting the vessel 1, the user turns the battery switch 81 on and then turns the main switch 5 on. This causes the main switch 5 to provide an activation signal to the remote controller ECU 70 and the engine ECU 30. In response to the activation signal, the remote controller ECU 70 and the engine ECU 30 start to operate (Step S2).

The remote controller ECU 70 acquires engine speed information from the engine ECU 30 (Step S3) and, based on this, determines whether the engine 13 is operating (determines that the engine is started). More specifically, it is determined whether the engine speed is equal to or higher than a predetermined starting threshold value (e.g., 600 rpm) (Step S4). The user operating the starter switch 6 causes a start command to be provided from the remote controller ECU 70 to the engine ECU 30. In response to this, the engine ECU 30 turns the starter relay 25 on to energize the starter motor 22. This causes the starter motor 22 to be driven and the engine 13 to be started and operated. The engine speed then becomes equal to or higher than the starting threshold value.

When the engine 13 operates (Step S4: YES), the remote controller ECU 70 outputs a control signal to turn the switch 91 on (Step S5). This causes the switch 91 to be turned on and the accessory battery 61 to be connected to the power line 41. The propulsion device battery 51 and the accessory battery 61 are thus connected in parallel with respect to the power line 41. Not only the propulsion device battery 51 but also the accessory battery 61 is thus connected to the propulsion device 11. In this state, during operation of the engine 13, electric power generated by the generator 23 is supplied via the power line 41 to charge both the propulsion device battery 51 and the accessory battery 61. After this process, the routine returns to Step S4.

On the other hand, when using the navigational equipment 68, the user turns the battery switch 83 on. At this time, when the switch 91 is in an OFF state, the navigational equipment 68 is supplied exclusively with electric power from the accessory battery 61, which prevents the remaining level of the propulsion device battery 51 from decreasing. On the other hand, when the switch 91 is in an ON state, the propulsion device battery 51 and the accessory battery 61 are connected in parallel to the power line 46 for the navigational equipment 68. The navigational equipment 68 is therefore powered by both the propulsion device battery 51 and the accessory battery 61. When the engine 13 of the propulsion device 11 operates, the navigational equipment 68 is supplied with electric power generated by the generator 23.

Even when the main switch 5 may be turned on, the determination at Step S4 is NO before the engine 13 has started, and the routine returns to Step S1. That is, the switch 91 is kept off. Accordingly, the propulsion device 11 is powered exclusively by the propulsion device battery 51, while the navigational equipment 68 is powered exclusively by the accessory battery 61. In this case, since the remote controller ECU 70 and the engine ECU 30 have already been activated, the process at Step S2 is skipped. That is, when the main switch 5 is turned on, the process at Step S2 is performed just one time and not performed two or more times.

When the main switch 5 is turned off during operation of the engine 13, the engine ECU 30 stops the engine 13. In response to this, the engine speed decreases, such that the determination at Step S4 is NO and the routine returns to Step S1. In this case, since the main switch 5 is in an OFF state (Step S1: NO), the remote controller ECU 70 and the engine ECU 30 stop (Step 6). The remote controller ECU 70 then stops outputting the control signal to the switch 91. In response to this, the switch 91 is turned off to be its initial state (Step S7). Accordingly, the parallel connection between the propulsion device battery 51 and the accessory battery 61 is terminated.

Upon terminating use of the vessel 1, the user turns both the battery switches 81, 83 off. The propulsion device battery 51 and the accessory battery 61 are then put into an open state where no load is connected. After several hours in this state, the OCV sensor 111 measures the open circuit voltage OCV11 of the propulsion device battery 51 and the OCV sensor 211 measures the open circuit voltage OCV21 of the accessory battery 61. The thus-measured open circuit voltages OCV11, OCV21 are stored in the respective memories 114, 214.

Figure 3:
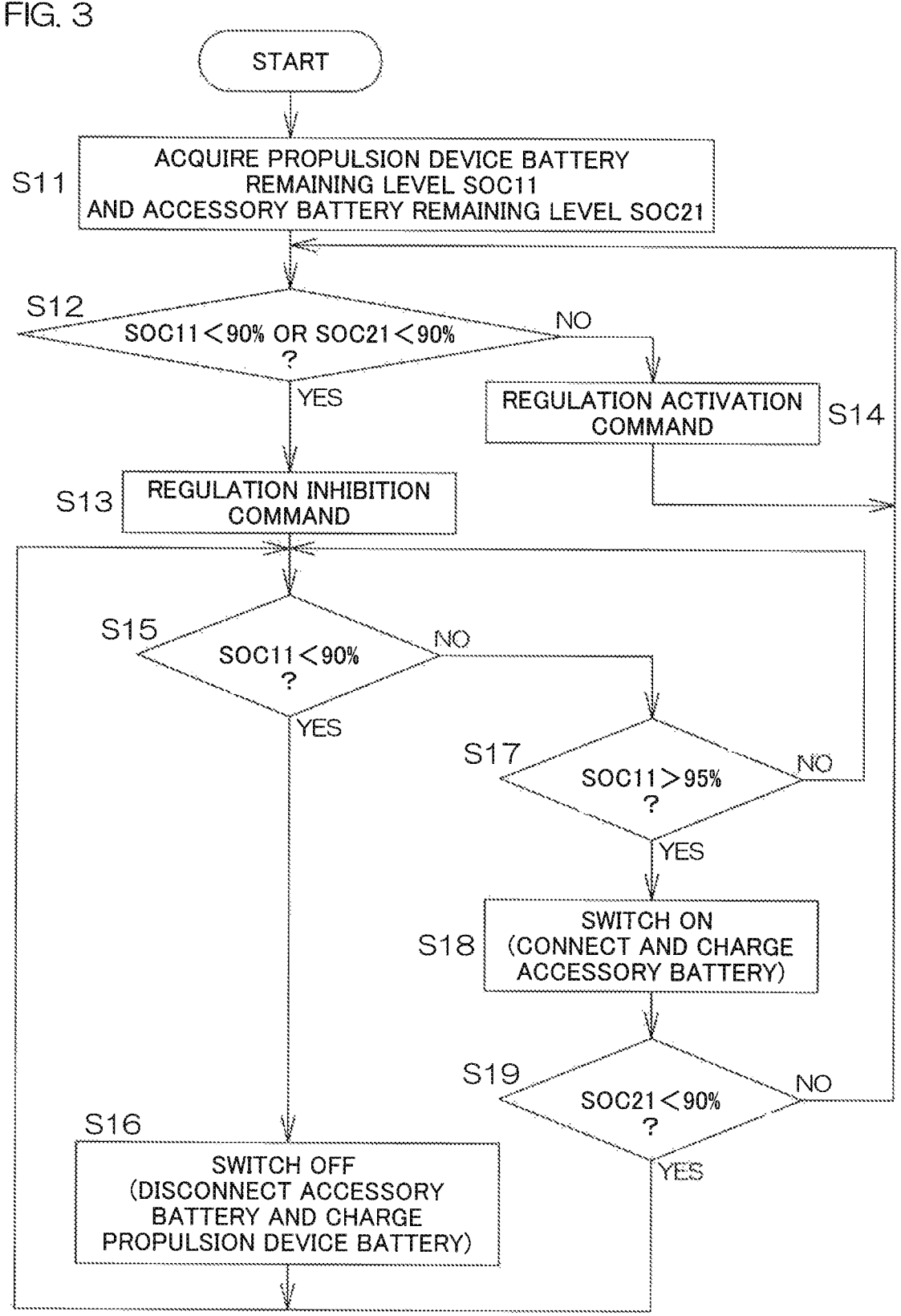
FIG. 3 is a flowchart illustrating charge control.

FIG. 3 is a flowchart for illustrating charge control by the remote controller ECU 70, showing processes performed by the remote controller ECU 70 repeatedly at a predetermined control cycle during engine operation. Since the engine 13 operates, the switch 91 is in an ON state (see Steps S4, S5 in FIG. 2).

The remote controller ECU 70 acquires the remaining level SOC11 of the propulsion device battery 51 from the propulsion device battery remaining level computing processor 113 and the remaining battery level SOC21 of the accessory battery 61 from the accessory battery remaining level computing processor 213 (Step S11). The remote controller ECU 70 checks whether the remaining level SOC11 of the propulsion device battery 51 is lower than a predetermined charge limiting threshold value (e.g., about 90%) and checks whether the remaining level SOC21 of the accessory battery 61 is lower than a predetermined charge limiting threshold value (e.g., about 90%) (Step S21). When at least one of these is met (Step S12: YES), at least one of the batteries has capacity to be charged and the remote controller ECU 70 provides a regulation inhibition command to the engine ECU 30 (Step S13). Thus, since the engine ECU 30 does not output a regulation command to the regulation controlling circuit 33, electric power generated by the generator 23 is output from the charging circuit 31 into the power line 41 to charge either one of, or both of the propulsion device battery 51 and the accessory battery 61.

When the remaining level SOC11 of the propulsion device battery 51 is equal to or higher than the charge limiting threshold value (e.g., about 90%) and the remaining level SOC21 of the accessory battery 61 is equal to or higher than the charge limiting threshold value (e.g., about 90%) (Step S12: NO), the remote controller ECU 70 provides a regulation activation command to the engine ECU 30 (Step S14). This causes the engine ECU 30 to provide a regulation command to the regulation controlling circuit 33 and, in response to this, the regulation controlling circuit 33 operates the regulation circuit 32. The operation of the charging circuit 31 is therefore disabled, so that the power line 41 is not supplied with direct-current power to charge the batteries 51, 61. The batteries 51, 61 are thus prevented from being charged.

When charging is allowed (Step S13) and when the remaining level SOC11 of the propulsion device battery 51 is lower than a predetermined charge starting threshold value (e.g., about 90%) (Step S15: YES), the remote controller ECU 70 turns the switch 91 off (Step S16) and the routine returns to Step S15. Thus, when the remaining level SOC11 of the propulsion device battery 51 decreases, the accessory battery 61 is isolated from the power line 41. Accordingly, the current from the power line 41 flows exclusively into and charges the propulsion device battery 51. This allows the propulsion device battery 51 to be charged immediately to restart the engine.

When the remaining level SOC11 of the propulsion device battery 51 is equal to or higher than the charge starting threshold value (e.g., about 90%) (Step S15: NO), the remote controller ECU 70 further determines whether the remaining level SOC11 of the propulsion device battery 51 exceeds a charge terminating threshold value (e.g., about 95%), which is a higher threshold value (Step S17). When the remaining level SOC11 of the propulsion device battery 51 is equal to or higher than the charge starting threshold value (e.g., about 90%) but does not exceed the charge terminating threshold value (e.g., about 95%) (Step S17: NO), the remote controller ECU 70 keeps the switch 91 off and the routine returns to Step S15. When the propulsion device battery 51 is further charged and the determination at Step S17 is YES, the remote controller ECU 70 turns the switch 91 on (Step S18). Not only the propulsion device battery 51 but also the accessory battery 61 is thus connected to the power line 41. The remote controller ECU 70 further determines whether the remaining level SOC21 of the accessory battery 61 is lower than a predetermined charge starting threshold value (e.g., about 90%) (Step S19). When the determination is YES, that is, when the propulsion device battery 51 is charged sufficiently and the remaining level of the accessory battery 61 decreases, the switch 91 is kept on and the routine returns to Step S15. In this case, the accessory battery 61, which has a lower remaining level, is to be charged preferentially. On the other hand, when the remaining level SOC21 of the accessory battery 61 is equal to or higher than the charge starting threshold value (e.g., about 90%) (Step S19: NO), the routine returns to Step S12. In this case, both the propulsion device battery 51 and the accessory battery 61 are charged sufficiently, so that the determination at Step S12 is YES and a charge inhibition state occurs (Step S14).

As described above, in accordance with the present preferred embodiment, the vessel power supply system for the vessel 1 includes the propulsion device battery 51 that supplies power to the propulsion device 11 and the accessory battery 61 that supplies power to the accessories such as the navigational equipment 68. The vessel power supply system also includes the OCV sensor 111 that detects the open circuit voltage of the propulsion device battery 51 and the OCV sensor 211 that detects the open circuit voltage of the accessory battery 61. The vessel power supply system further includes the switch 91 including the switch 91a to be turned on/off to open and close the current path 48 between the propulsion device battery 51 and the accessory battery 61, and the remote controller ECU 70 as a switch controller that controls the switch 91. The switch 91 is connected via the current path 48 and the power line 41 to the propulsion device 11 to connect/disconnect the accessory battery 61 and the propulsion device 11.

When the main switch 5 is turned off, the remote controller ECU 70 automatically turns the switch 91 off (Step S7). This allows the propulsion device battery 51 and the accessory battery 61 to be disconnected when the vessel 1 is not used. In this state, the OCV sensor 111 is able to detect the open circuit voltage of the propulsion device battery 51 accurately without being impacted by the accessory battery 61. The OCV sensor 211 is also able to detect the open circuit voltage of the accessory battery 61 accurately without being impacted by the propulsion device battery 51. The battery remaining level computing processors 113, 213 therefore use the open circuit voltages detected by the OCV sensors 111, 211 to obtain the remaining battery levels SOC11, SOC21 of the propulsion device battery 51 and the accessory battery 61 individually and accurately. Therefore, control based on the remaining battery levels SOC11, SOC21, particularly charge control is performed adequately.

In the present preferred embodiment, the remote controller ECU 70 also functions as a start determining processor that determines whether the engine 13 of the propulsion device 11 has started (Step S4). Determining that the main switch 5 is turned on and that the engine 13 has started, the remote controller ECU 70 then turns the switch 91 on (Step S5). Accordingly, when the engine 13 starts, the switch 91 is turned on automatically to connect the accessory battery 61 to the propulsion device 11. It is therefore possible, when the vessel 1 is used, particularly after the engine 13 has started, to use electric power not only from the propulsion device battery 51 but also from the accessory battery 61 at the propulsion device 11. It is also possible to charge both the propulsion device battery 51 and the accessory battery 61 with electric power generated by the generator 23 driven by the engine 13. On the other hand, when starting the engine 13, the accessory battery 61 is disconnected from the propulsion device 11, which prevents electric power from the accessory battery 61 from being used to start the engine 13.

In the present preferred embodiment, it is possible to reliably determine whether the engine 13 has started using the engine speed. This allows the switch 91 to be turned on/off adequately, such that the connection/disconnection between the accessory battery 61 and the propulsion device 11 is controlled adequately. The remote controller ECU 70 monitors the voltage of the power line 41 to monitor the circuit voltage within the propulsion device 11. The circuit voltage increases when the engine 13 has started and the generator 23 starts to operate. Hence, the remote controller ECU 70 is able to determine whether the engine 13 has started based on the voltage of the power line 41 instead of the engine speed.

Also, in the present preferred embodiment, when the main switch 5 is turned off so that the switch 91 is turned off and the propulsion device battery 51 is not under load and in equilibrium, the open circuit voltage detected by the OCV sensor 111 is stored in the memory 114 defining a first storage. Similarly, when the accessory battery 61 is not under load and in equilibrium, the open circuit voltage detected by the OCV sensor 211 is stored in the memory 214 defining a second storage. The memories 114, 214 are therefore stored with the respective open circuit voltages OCV11, OCV12 detected under a condition where the propulsion device battery 51 and the accessory battery 61 do not impact each other. It is therefore possible to use the open circuit voltages OCV11, OCV12 stored in the respective memories 114, 214 to obtain the remaining battery levels SOC11, SOC21 of the propulsion device battery 51 and the accessory battery 61 accurately.

The propulsion device battery remaining level computing processor 113 is a first battery remaining level calculator that calculates the remaining level SOC11 of the propulsion device battery 51 according to the open circuit voltage OCV11 stored in the memory 114 and an integrated value of the current flowing into/out of the propulsion device battery 51. The accessory battery remaining level computing processor 213 is a second battery remaining level calculator that calculates the remaining battery level SOC21 of the accessory battery 61 according to the open circuit voltage OCV21 stored in the memory 214 and an integrated value of the current flowing into/out of the accessory battery 61. Since the open circuit voltages OCV11, OCV21 are detected accurately, the remaining battery levels SOC11, SOC21 are also calculated accurately.

Also, in the present preferred embodiment, when the switch 91 is turned on and once the remaining battery level SOC11 (first battery remaining level) of the propulsion device battery 51 becomes lower than a charge starting threshold value (first threshold value) (Step S15: YES), the remote controller ECU 70 turns the switch 91 off (Step S16). This causes the accessory battery 61 and the propulsion device 11 to be disconnected. This causes the charging circuit 31 of the propulsion device 11 not to charge the accessory battery 61 but to charge the propulsion device battery 51 exclusively. It is therefore possible to charge the propulsion device battery 51 preferentially and power the propulsion device 11 securely to keep the propulsion device 11 in an operable state to restart the engine. Since the remaining battery level SOC11 is obtained accurately, the charge control is performed adequately.

Further, in the present preferred embodiment, when the switch 91 is turned off and once the propulsion device battery 51 is charged sufficiently and the remaining battery level SOC11 exceeds a charge terminating threshold value (second threshold value) (Step S17), the remote controller ECU 70 turns the switch 91 on. This starts charging the accessory battery 61 after the propulsion device battery 51 is fully charged. It is thus possible to also charge the accessory battery 61 with electric power generated by the generator 23 of the propulsion device 11 while preferentially charging the propulsion device battery 51. Since the remaining battery level SOC11 is obtained accurately, the charge control is also performed adequately.

In the present preferred embodiment, since the charge terminating threshold value (e.g., about 95%) is higher than the charge starting threshold value (e.g., about 90%), the switch 91 is turned on/off hysteretically with respect to the remaining level SOC11 of the propulsion device battery 51. This allows the charge control for the propulsion device battery 51 and the accessory battery 61 to be performed adequately while preventing the switch 91 from being turned on/off frequently. It is noted that the charge terminating threshold value may be equal to the charge starting threshold value.

When the remaining level SOC11 of the propulsion device battery is equal to or higher than its charge limiting threshold value (third threshold value; e.g., about 90%) and when the remaining level SOC21 of the accessory battery is equal to or higher than its charge limiting threshold value (fourth threshold value; e.g., about 90%), the remote controller ECU 70 outputs a regulation activation command (Step S14). In response to this, the regulation controlling circuit 33 activates the regulation circuit 32 under the control of the engine 13 to limit the charging operation of the charging circuit 31. That is, the regulation controlling circuit 33 and the regulation circuit 32 define a non-limiting example of charge limiter. When both the propulsion device battery 51 and the accessory battery 61 are charged sufficiently, the charging operation of the charging circuit 31 is limited and thus the batteries 51, 61 are prevented from being overcharged. Since the remaining battery level SOC11 of the propulsion device battery 51 and the remaining battery level SOC21 of the accessory battery 61 are both obtained accurately, the charge limiting control is performed adequately.

It is noted that the charge limiting threshold value compared with the remaining level SOC11 of the propulsion device battery at Step S12 may be arbitrary as long as it is equal to or higher than the charge starting threshold value used for the determination at Step S15. In addition, the charge limiting threshold value compared with the remaining level SOC21 of the accessory battery at Step S12 may be arbitrary as long as it is equal to or higher than the charge starting threshold value used for the determination at Step S19. The charge limiting threshold value for the propulsion device battery 51 may not necessarily be equal to the charge limiting threshold value for the accessory battery 61. The charge starting threshold value for the propulsion device battery 51 (Step S15) may not necessarily be equal to the charge starting threshold value for the accessory battery 61 (Step S19).

Figure 4A:
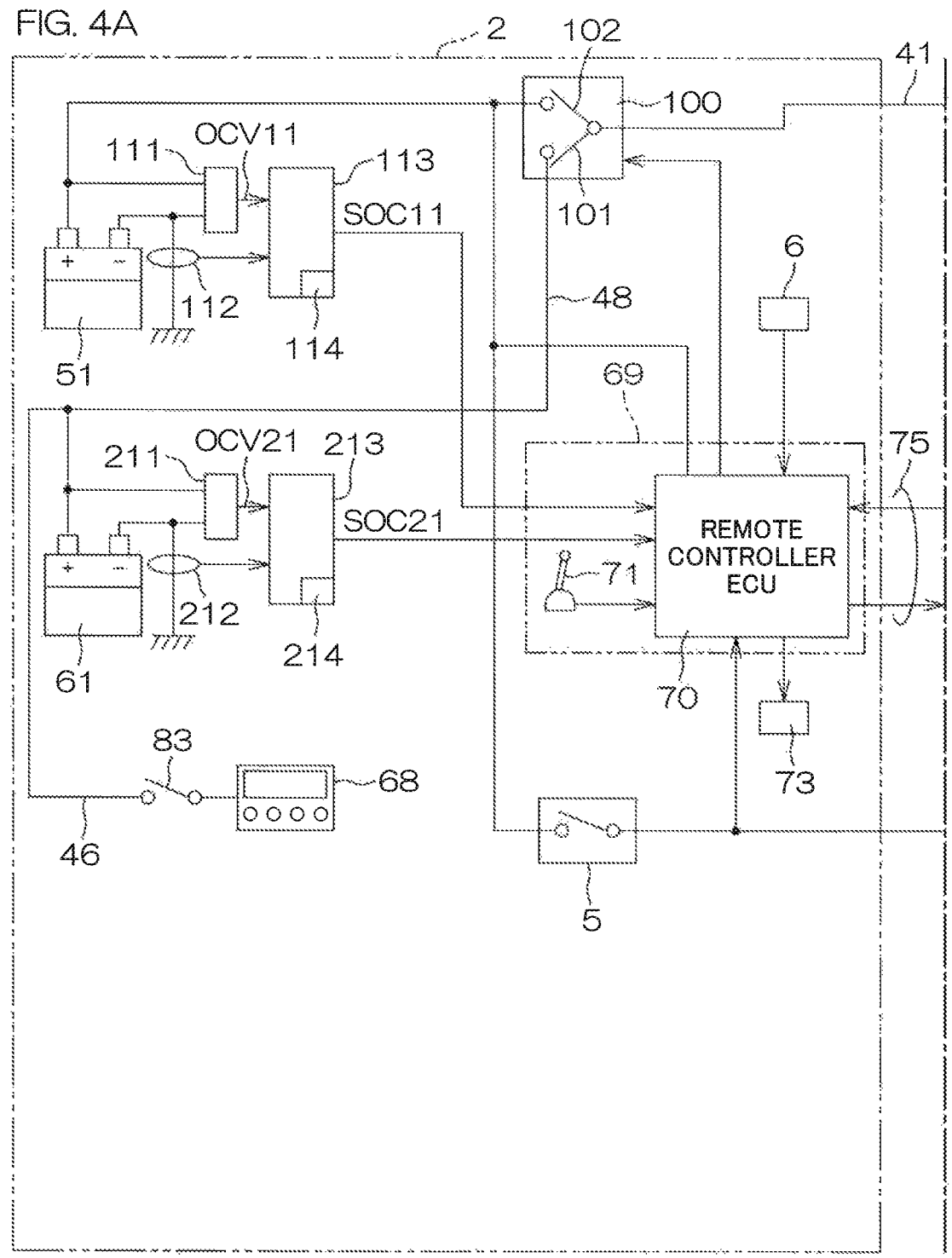
FIGS. 4A and 4B are block diagrams illustrating the configuration of a power supply system of a vessel according to another preferred embodiment of the present invention.
Figure 4B:
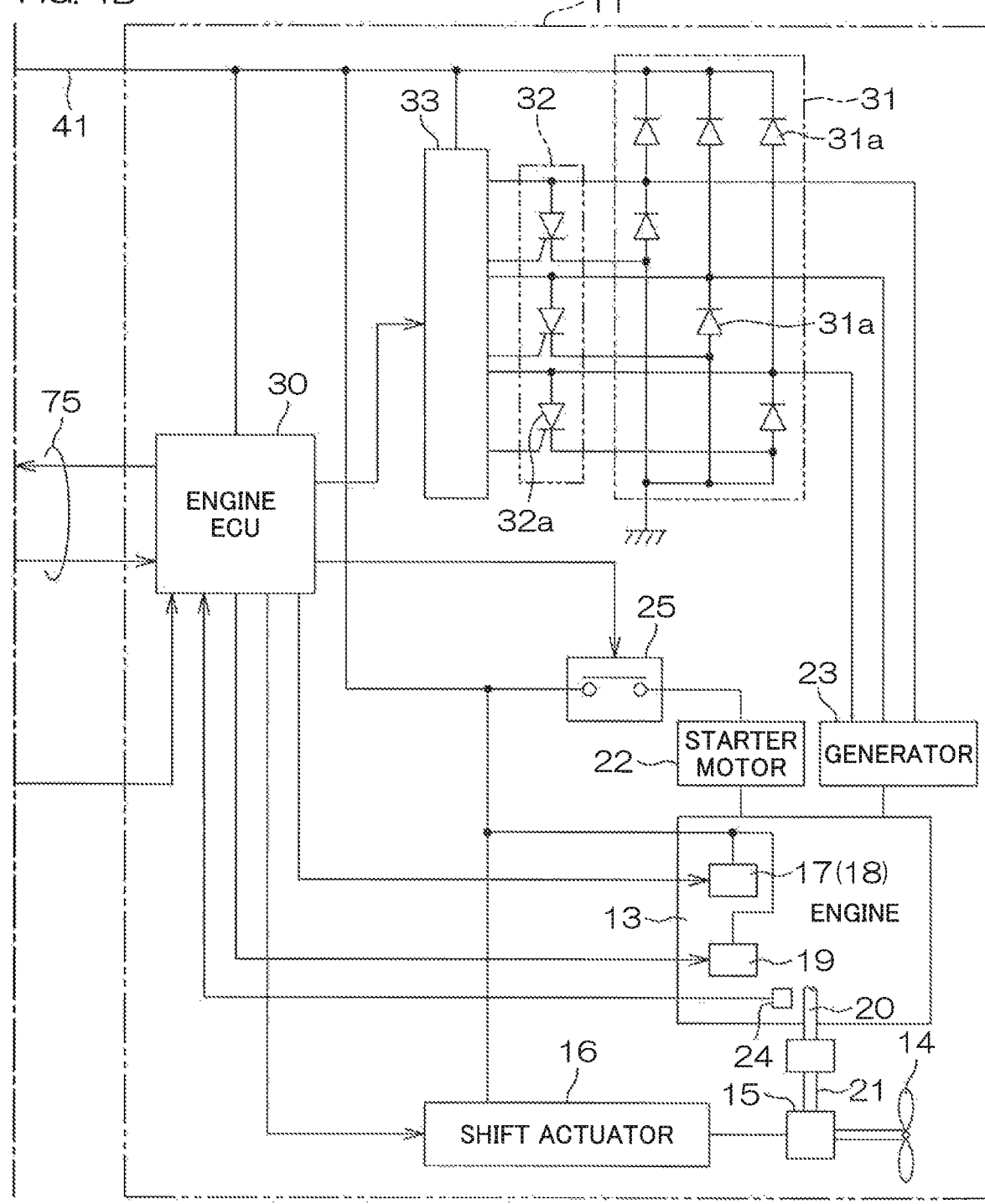

FIGS. 4A and 4B are block diagrams illustrating the configuration of a power supply system of a vessel 1 according to another preferred embodiment of the present invention. FIGS. 4A and 4B can be combined side by side with the alternate long and short dashed lines overlapping each other to form one block diagram. In FIGS. 4A and 4B, components corresponding to those shown in FIGS. 1A and 1B are designated by the same reference signs. In the present preferred embodiment, instead of the switch 91 in the preferred embodiment shown in FIGS. 1A and 1B, a switch 100 including a three-way switch including a first switch 101 and a second switch 102 is provided. The first switch 101 is turned on/off to connect/disconnect the power line 41 and the accessory battery 61. The second switch 102 is turned on/off to connect/disconnect the power line 41 and the propulsion device battery 51. The first and second switches 101, 102 may each be a semiconductor switch, for example. The main switch 5 is connected to the power line 41 at a position closer to the propulsion device battery 51 than the switch 100 (i.e., connected to the propulsion device battery 51). While in the present preferred embodiment, the battery switch 81 (see FIG. 1A) is not shown, a similar battery switch may be disposed in the power line 41 in an interposed manner at a position closer to the propulsion device 11 than the switch 100.

Figure 5:
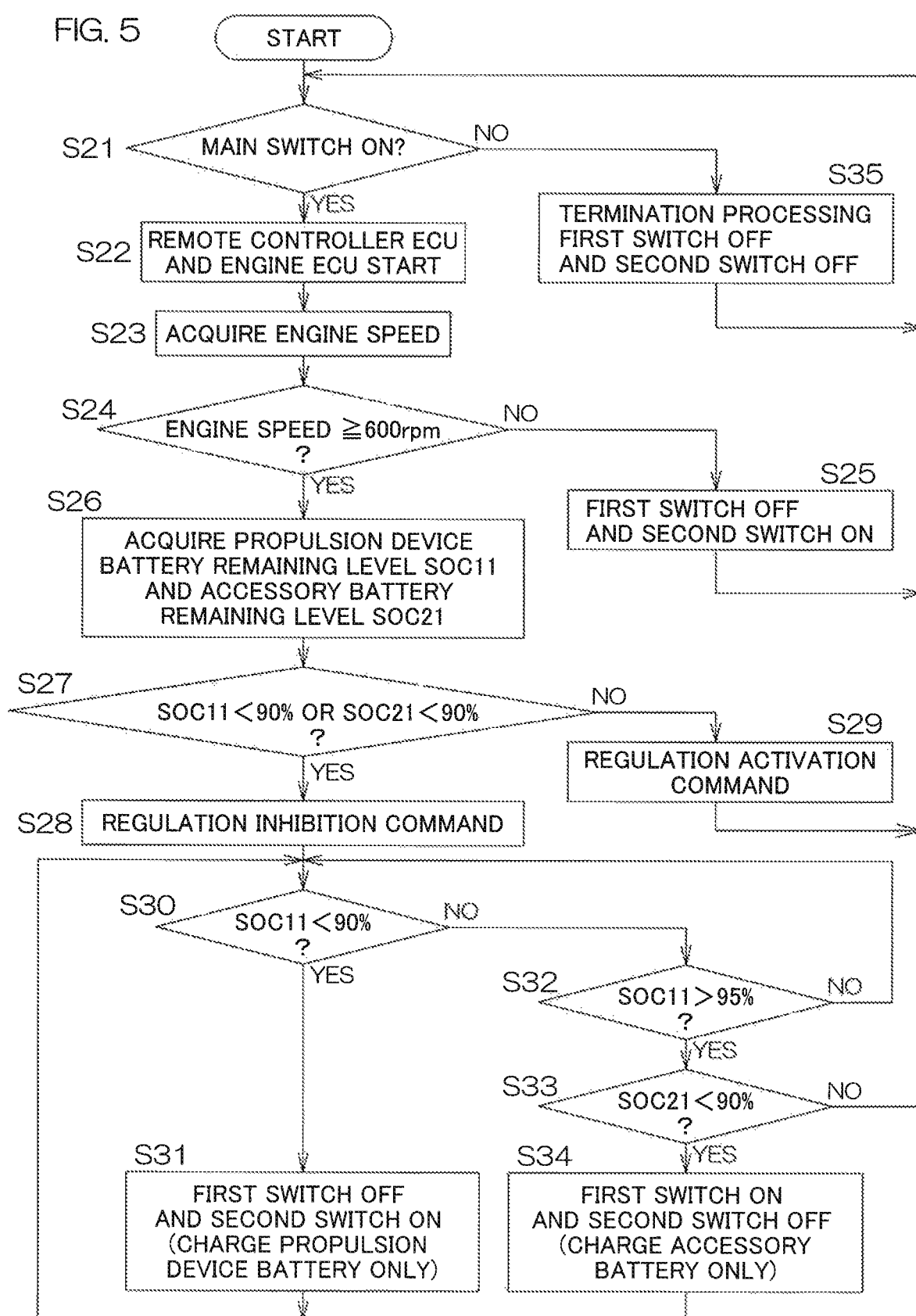
FIG. 5 is a flowchart showing control of a switch performed to measure an open circuit voltage of a battery accurately and perform charge control of the battery.

FIG. 5 is a flowchart showing control of the switch 100 performed to measure an open circuit voltage accurately using the OCV sensors 111, 211 and for battery charge control, mainly illustrating processes performed by the remote controller ECU 70. In an initial state of the switch 100, both the first switch 101 and the second switch 102 are off.

The remote controller ECU 70 determines whether the main switch 5 is in an ON state (Step S21). Upon starting to use the vessel 1, the user turns the main switch 5 on. This causes the main switch 5 to provide an activation signal to the remote controller ECU 70 and the engine ECU 30. In response to the activation signal, the remote controller ECU 70 and the engine ECU 30 start to operate (Step S22).

The remote controller ECU 70 acquires engine speed information from the engine ECU 30 (Step S23) and, based on this, determines whether the engine 13 is operating. More specifically, it is determined whether the engine speed is equal to or higher than a predetermined starting threshold value (e.g., about 600 rpm) (Step S24). The user operating the starter switch 6 causes a start command to be provided from the remote controller ECU 70 to the engine ECU 30. In response to this, the engine ECU 30 turns the starter relay 25 on to energize the starter motor 22. This causes the starter motor 22 to be driven and thus the engine 13 to be started and operated. The engine speed then becomes equal to or higher than the starting threshold value.

Even when the main switch 5 is turned on, the determination at Step S24 is NO before starting the engine 13. The remote controller ECU 70 then turns the first switch 101 off and the second switch 102 on (Step S25). This causes the propulsion device battery 51 to be connected to the power line 41, while the accessory battery 61 is disconnected from the power line 41. Afterwards, the routine returns to Step S21. In this case, since the remote controller ECU 70 and the engine ECU 30 have already been activated, the process at Step S22 is skipped. That is, when the main switch 5 is turned on, the process at Step S22 is performed just one time and not performed two or more times.

When the engine 13 starts (Step S24: YES), the remote controller ECU 70 acquires the propulsion device battery remaining level SOC11 and the accessory battery remaining level SOC21 from the battery remaining level computing processors 113, 213 (Step S26). The remote controller ECU 70 checks whether the remaining level SOC11 of the propulsion device battery is lower than a predetermined charge limiting threshold value (e.g., about 90%) and checks whether the remaining level SOC21 of the accessory battery is lower than a predetermined charge limiting threshold value (e.g., about 90%) (Step S27). When at least one of these conditions is met (Step S27: YES), at least one of the batteries has capacity to be charged and the remote controller ECU 70 provides a regulation inhibition command to the engine ECU 30 (Step S28). Thus, since the engine ECU 30 does not output a regulation command to the regulation controlling circuit 33, electric power generated by the generator 23 is output from the charging circuit 31 into the power line 41 to charge one of the propulsion device battery 51 and the accessory battery 61.

When the remaining level SOC11 of the propulsion device battery is equal to or higher than the charge limiting threshold value (e.g., about 90%) and the remaining level SOC21 of the accessory battery is equal to or higher than the charge limiting threshold value (e.g., about 90%) (Step S27: NO), the remote controller ECU 70 provides a regulation activation command to the engine ECU 30 (Step S29). This causes the engine ECU 30 to provide a regulation command to the regulation controlling circuit 33 and, in response to this, the regulation controlling circuit 33 operates the regulation circuit 32. The operation of the charging circuit 31 is therefore disabled, so that the power line 41 is not supplied with direct-current power to charge the batteries 51, 61. The batteries 51, 61 are thus prevented from being charged. Afterwards, the routine returns to Step S21.

When charging is allowed (Step S28) and when the remaining level SOC11 of the propulsion device battery is lower than the charge starting threshold value (e.g., about 90%) (Step S30: YES), the remote controller ECU 70 turns the first switch 101 off, while turning the second switch 102 on (Step S31). This causes the propulsion device battery 51 to be connected to the power line 41, while the accessory battery 61 is isolated from the power line 41. Accordingly, the current from the power line 41 flows exclusively into and charges the propulsion device battery 51. This allows the propulsion device battery 51 to be charged immediately to restart the engine.

When the remaining level SOC11 of the propulsion device battery 51 is equal to or higher than the charge starting threshold value (e.g., about 90%) (Step S30: NO), the remote controller ECU 70 further determines whether the remaining level SOC11 of the propulsion device battery 51 exceeds a charge terminating threshold value (e.g., about 95%), which is a higher threshold value (Step S32). When the remaining level SOC11 of the propulsion device battery 51 is equal to or higher than the charge starting threshold value (e.g., about 90%) but does not exceed the charge terminating threshold value (e.g., about 95%) (Step S32: NO), the remote controller ECU 70 keeps the state of the switch 100 (the first switch 101 off, while the second switch 102 on) and the routine returns to Step S30. When the propulsion device battery 51 is further charged and the determination at Step S32 is YES, the remote controller ECU 70 determines whether the remaining level SOC21 of the accessory battery 61 is lower than the charge starting threshold value (e.g., about 90%) (Step S33). When the determination is YES, that is, the propulsion device battery 51 is charged sufficiently and the remaining level of the accessory battery 61 decreases, the remote controller ECU 70 turns the first switch 101 on, while turning the second switch 102 off (Step S34) and the routine returns to Step S30. This causes the propulsion device battery 51 to be isolated from the power line 41 and the accessory battery 61 to be connected to the power line 41. Accordingly, the current from the power line 41 flows exclusively into and charges the accessory battery 61. This allows the accessory battery 61 to be charged immediately. On the other hand, when the remaining level SOC21 of the accessory battery 61 is equal to or higher than the charge starting threshold value (e.g., about 90%) (Step S33: NO), the state of the switch 100 is maintained (the first switch 101 off, while the second switch 102 on) and the routine returns to Step S21. In this case, the determination at Step S27 is NO and the remote controller ECU 70 provides a regulation activation command to the engine ECU 30 (Step S29). The function of the charging circuit 31 is therefore disabled and a charge inhibition state occurs. Afterwards, the routine returns to Step S21.

When the main switch 5 is turned off (Step S21: NO), the remote controller ECU 70 and the engine ECU 30 perform a termination process to stop the operations (Step S35). Although not shown, the remote controller ECU 70 constantly monitors the state of the main switch 5 and, when the main switch 5 is turned off even during any step shown in FIG. 5, performs the termination process (Step S35). In this termination process, the remote controller ECU 70 controls the switch 100 to be in its initial state. That is, both the first switch 101 and the second switch 102 are turned off. Accordingly, both the propulsion device battery 51 and the accessory battery 61 are disconnected from the power line 41 and also from each other. This causes the propulsion device battery 51 to be in an open state in which no load is connected and the accessory battery 61 is also not connected.

Upon terminating use of the vessel 1, the user turns the battery switch 83 off. This causes the accessory battery 61 to be in an open state in which no load is connected and the propulsion device battery 51 is also not connected. After several hours in this state, the OCV sensor 111 measures the open circuit voltage OCV11 of the propulsion device battery 51 and the OCV sensor 211 measures the open circuit voltage OCV21 of the accessory battery 61. The thus-measured open circuit voltages OCV11, OCV21 are stored in the respective memories 114, 214.

The present preferred embodiment exhibits the same operational advantageous effects as in the above-described first preferred embodiment.

Also, in the present preferred embodiment, turning the second switch 102 off allows not only the accessory battery 61 but also the propulsion device battery 51 to be isolated from the propulsion device 11. This allows the propulsion device battery 51 to be not under load reliably, which makes it possible to detect the open circuit voltage OCV11 of the propulsion device battery 51 more accurately. Depending on this, the accuracy in calculating the remaining level SOC11 of the propulsion device battery 51 is improved.

Also, in the present preferred embodiment, once the remaining level SOC11 of the propulsion device battery exceeds the charge terminating threshold value (second threshold value) (Step S32: YES) and when the remaining level SOC21 of the accessory battery is lower than the charge starting threshold value (Step S33: YES), the first switch 101 is turned on, while the second switch 102 is turned off (Step S31). Accordingly, once the propulsion device battery 51 is charged sufficiently, the propulsion device battery 51 is disconnected from the propulsion device 11, while the accessory battery 61 is connected to the propulsion device 11. This causes the accessory battery 61 to be charged exclusively with electric power generated by the generator 23 in the propulsion device 11. That is, the propulsion device battery 51 is charged preferentially with only the propulsion device battery 51 being connected to the propulsion device 11, and thereafter the propulsion device battery 51 is disconnected from the propulsion device 11 and the accessory battery 61 is charged. After the propulsion device battery 51 is thus charged preferentially and sufficiently, the accessory battery 61 is then charged immediately. Since the remaining level SOC11 of the propulsion device battery 51 and the remaining level SOC21 of the accessory battery 61 is obtained accurately, the on/off control for the first and second switches 101, 102 is performed adequately based on the remaining battery levels SOC11, SOC21.

Further, also in the present preferred embodiment, when the remaining level SOC11 of the propulsion device battery is equal to or higher than the charge limiting threshold value (third threshold value; e.g., about 90%) and when the remaining level SOC21 of the accessory battery is equal to or higher than the charge limiting threshold value (fourth threshold value; e.g., about 90%), the charging operation by the charging circuit 31 is limited. The propulsion device battery 51 and the accessory battery 61 are prevented from being overcharged. Since the remaining battery levels SOC11, SOC21 is obtained accurately, the charge limiting control is performed adequately.

Figure 6A:
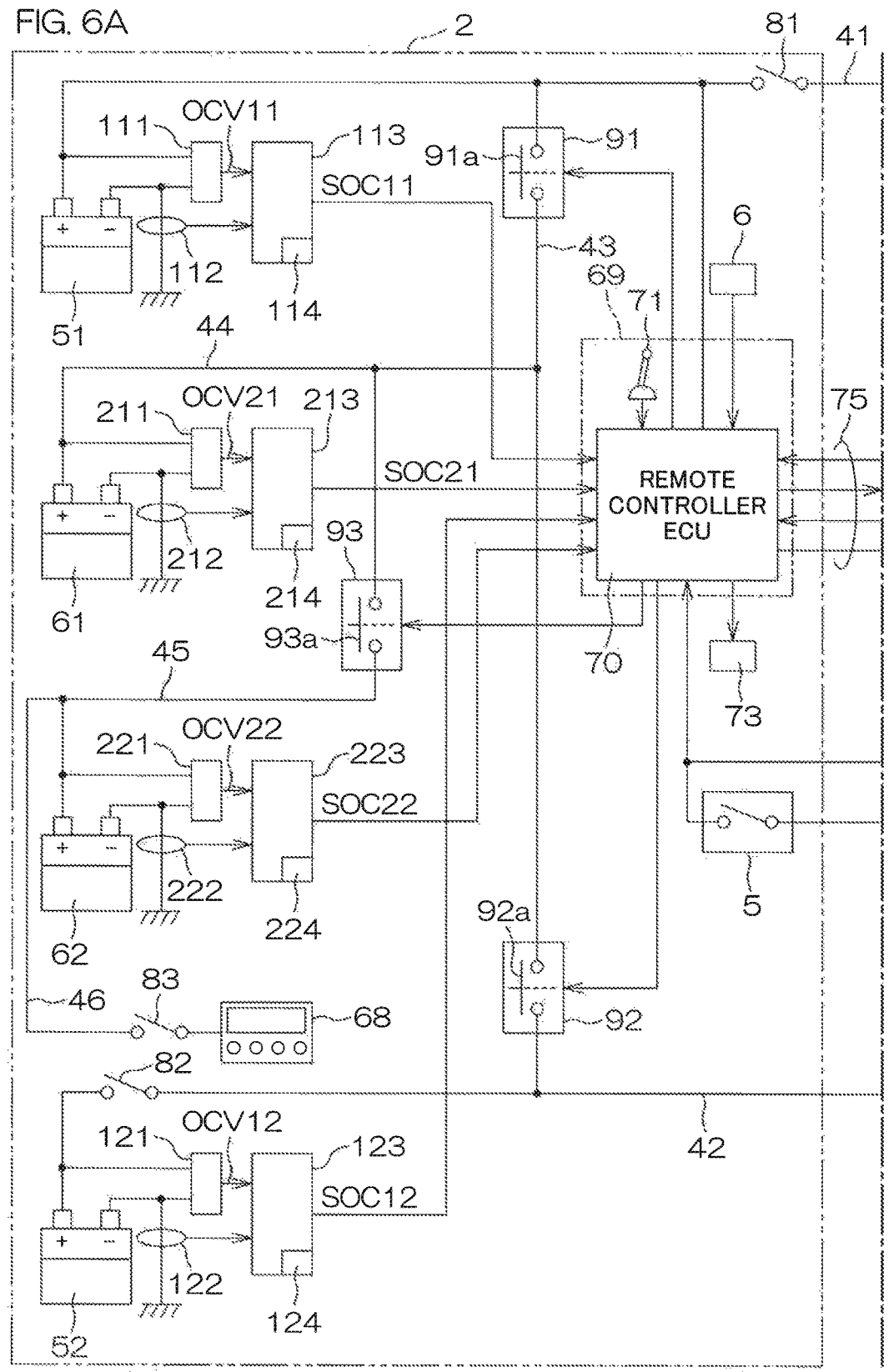
FIGS. 6A and 6B are block diagrams illustrating the configuration of a power supply system of a vessel according to still another preferred embodiment of the present invention.
Figure 6B:
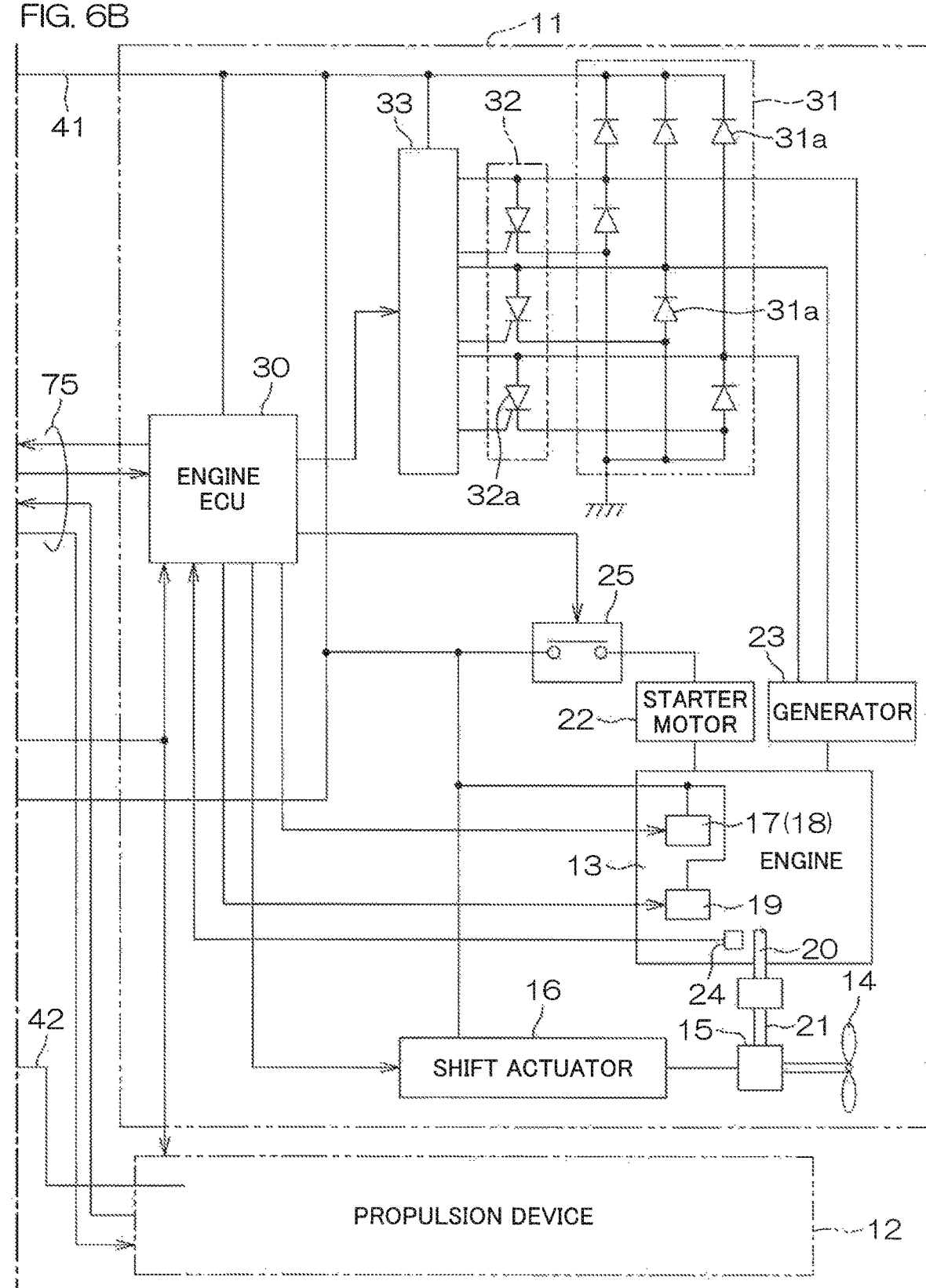

FIGS. 6A and 6B are block diagrams illustrating the configuration of a power supply system of a vessel 1 according to still another preferred embodiment of the present invention. In FIGS. 6A and 6B, components corresponding to those shown in FIGS. 1A and 1B are designated by the same reference signs. FIGS. 6A and 6B can be combined side by side with the alternate long and short dashed lines overlapping each other to form one block diagram. The vessel 1 of the present preferred embodiment includes multiple (two in the present preferred embodiment) propulsion devices 11, 12. The multiple propulsion devices 11, 12 may each be an outboard motor. Specifically, the vessel 1 may have a multi-motor configuration in which multiple outboard motors, for example, are arranged in parallel at the stern.

Since the first and second propulsion devices 11, 12 preferably have the same or substantially the same configuration, the internal configuration of the second propulsion device 12 is not shown. It is noted that in the following description, reference made to one of the components internal to the second propulsion device 12 uses the sign provided to the corresponding component internal to the first propulsion device 11.

The engine ECU 30 included in each of the first and second propulsion devices 11, 12 is connected via the signal line 75 to the remote controller ECU 70. In the present preferred embodiment, the main switch 5 is connected to the power line 41 of the first propulsion device 11. A start command generated when the main switch 5 is turned on is provided to the remote controller ECU 70 as well as the engine ECU 30 of each of the first and second propulsion devices 11, 12.

First and second propulsion device batteries 51, 52 are installed on the hull 2 corresponding to the respective first and second propulsion devices 11, 12. The first propulsion device battery 51 is connected via the first power line 41 to the first propulsion device 11. A battery switch 81 is disposed in the first power line 41 in an interposed manner. The second propulsion device battery 52 is connected via the second power line 42 to the second propulsion device 12. A battery switch 82 is disposed in the second power line 42 in an interposed manner. Further, in the present preferred embodiment, multiple (for example, two in the present preferred embodiment) accessory batteries 61, 62 are installed on the hull 2.

The first power line 41 and the second power line 42 are connected to each other through a third power line 43 located internally to the hull 2. The first and second propulsion device batteries 51, 52 are therefore connected in parallel with each other via the first and second power lines 41, 42 and the third power line 43. The third power line 43 is connected to the first power line 41 between the battery switch 81 and the first propulsion device battery 51. The third power line 43 is also connected to the second power line 42 at a position closer to the second propulsion device 12 than the battery switch 82. A first switch 91 including one switch 91a (e.g., a semiconductor switch) that is turned on/off to connect/disconnect the third power line 43 to/from the first power line 41 is disposed in the third power line 43 in an interposed manner. Further, a second switch 92 including one switch 92a (e.g., a semiconductor switch) that is turned on/off to connect/disconnect the third power line 43 to/from the second power line 42 is disposed in the third power line 43 in an interposed manner. When both the first and second switches 91, 92 are on (the switches 91a and 92a are on), the first and second power lines 41, 42 are connected to each other and thus the first and second propulsion device batteries 51, 52 are connected in parallel. That is, the first and second propulsion device batteries 51, 52 are connected in parallel with respect to the first propulsion device 11 and also connected in parallel with respect to the second propulsion device 12. The parallel connection is terminated when either one or both of the first and second switches 91, 92 are turned off (the switch 91a or 92a is turned off). The switches 91a, 92a define an example of a first switch.

A fourth power line 44 is connected to the third power line 43 between the first switch 91 and the second switch 92. The fourth power line 44 is connected to the first accessory battery 61. A fifth power line 45 branches off from the fourth power line 44 and is connected to the second accessory battery 62. The first and second accessory batteries 61, 62 are therefore connected in parallel with each other via the fourth power line 44 and the fifth power line 45. A third switch 93 including one switch 93a (e.g., a semiconductor switch) that is turned on/off to connect/disconnect the first and second accessory batteries 61, 62 is disposed in the fifth power line 45 in a manner interposed between the first and second accessory batteries 61, 62. When the third switch 93 is on (the switch 93a is on), the first and second accessory batteries 61, 62 are connected in parallel with respect to the third power line 43. In this case, when the first switch 91 is on, the first and second accessory batteries 61, 62 are connected in parallel with respect to the first propulsion device 11. Similarly, when the second switch 92 is on, the first and second accessory batteries 61, 62 are connected in parallel with respect to the second propulsion device 12.

The second accessory battery 62 is connected via a sixth power line 46 to the navigational equipment 68. A battery switch 83 to be turned on by a user upon using the navigational equipment 68 is disposed in the sixth power line 46 in an interposed manner. When the battery switch 83 is on and the third switch 93 is on, the first and second accessory batteries 61, 62 are connected in parallel to the navigational equipment 68. When the third switch 93 is turned off (the switch 93a is turned off), the parallel connection is terminated and the navigational equipment 68 is supplied exclusively with electric power from the second accessory battery 62.

The first, second, and third switches 91, 92, 93 are controlled to be turned on/off by the remote controller ECU 70.

The first propulsion device battery 51 is connected with an OCV sensor 111 that measures its open circuit voltage. A current sensor 112 is also provided to detect the current flowing into/out of the first propulsion device battery 51. Output signals from the OCV sensor 111 and the current sensor 112 are input to a first propulsion device battery remaining level computing processor 113. The first propulsion device battery remaining level computing processor 113 computes a remaining level SOC11 of the first propulsion device battery 51 based on the open circuit voltage OCV11 of the first propulsion device battery 51 detected by the OCV sensor 111 and the current detected by the current sensor 112. The first propulsion device battery remaining level computing processor 113 then, when the first propulsion device battery 51 is not under load and in equilibrium, stores the open circuit voltage OCV11 detected by the OCV sensor 111 at predetermined time intervals (e.g., every four hours) in the memory 114. The first propulsion device battery remaining level computing processor 113 further obtains, when the open circuit voltage OCV11 within the memory 114 is updated, an initial remaining battery level SOC11 (0) based on the updated open circuit voltage OCV11 and stores it in the memory 114. When some current flows into/out of the first propulsion device battery 51, the remaining level SOC11 of the first propulsion device battery 51 is computed using the initial remaining battery level SOC11 (0). Details of the computation are described above in connection with the first preferred embodiment. The computed remaining battery level SOC11 is input to the remote controller ECU 70.

Similarly, the second propulsion device battery 52 is connected with an OCV sensor 121 that measures its open circuit voltage. A current sensor 122 is also provided to detect the current flowing into/out of the second propulsion device battery 52. Output signals from the OCV sensor 121 and the current sensor 122 are input to a second propulsion device battery remaining level computing processor 123. The second propulsion device battery remaining level computing processor 123 computes a battery level SOC12 of the second propulsion device battery 52 based on the open circuit voltage OCV112 of the second propulsion device battery 52 detected by the OCV sensor 121 and the current detected by the current sensor 122. The second propulsion device battery remaining level computing processor 123 then, when the second propulsion device battery 52 is not under load and in equilibrium, stores the open circuit voltage OCV12 detected by the OCV sensor 121 at predetermined time intervals (e.g., every four hours) in the memory 124. The second propulsion device battery remaining level computing processor 123 further obtains, when the open circuit voltage OCV12 within the memory 124 is updated, an initial remaining battery level SOC12 (0) based on the updated open circuit voltage OCV12 and stores it in the memory 124. When some current flows into/out of the second propulsion device battery 52, the remaining battery level SOC12 of the second propulsion device battery 52 is computed using the initial remaining battery level SOC12 (0). The computed remaining battery level SOC12 is input to the remote controller ECU 70.

Similarly, the first accessory battery 61 is connected with an OCV sensor 211 that measures its open circuit voltage. A current sensor 212 is also provided to detect the current flowing into/out of the first accessory battery 61. Output signals from the OCV sensor 211 and the current sensor 212 are input to a first accessory battery remaining level computing processor 213. The first accessory battery remaining level computing processor 213 computes a remaining battery level SOC21 of the first accessory battery 61 based on the open circuit voltage OCV21 of the first accessory battery 61 detected by the OCV sensor 211 and the current detected by the current sensor 212. The first accessory battery remaining level computing processor 213 then, when the first accessory battery 61 is not under load and in equilibrium, stores the open circuit voltage OCV21 detected by the OCV sensor 211 at predetermined time intervals (e.g., every four hours) in the memory 214. The first accessory battery remaining level computing processor 213 further obtains, when the open circuit voltage OCV21 within the memory 214 is updated, an initial remaining battery level SOC21 (0) based on the updated open circuit voltage OCV21 and stores it in the memory 214. When some current flows into/out of the first accessory battery 61, the remaining battery level SOC21 of the first accessory battery 61 is computed using the initial remaining battery level SOC21 (0). The computed remaining battery level SOC21 is input to the remote controller ECU 70.

Similarly, the second accessory battery 62 is connected with an OCV sensor 221 that measures its open circuit voltage. A current sensor 222 is also provided to detect the current flowing into/out of the second accessory battery 62. Output signals from the OCV sensor 221 and the current sensor 222 are input to a second accessory battery remaining level computing processor 223. The second accessory battery remaining level computing processor 223 computes a battery level SOC22 of the second accessory battery 62 based on the open circuit voltage OCV22 of the second accessory battery 62 detected by the OCV sensor 221 and the current detected by the current sensor 222. The second accessory battery remaining level computing processor 223 then, when the second accessory battery 62 is not under load and in equilibrium, stores the open circuit voltage OCV22 detected by the OCV sensor 221 at predetermined time intervals (e.g., every four hours) in the memory 224. The second accessory battery remaining level computing processor 223 further, when the open circuit voltage OCV22 within the memory 224 is updated, obtains an initial remaining battery level SOC22 (0) based on the updated open circuit voltage OCV22 and stores it in the memory 224. When some current flows into/out of the second accessory battery 62, the remaining battery level SOC22 of the second accessory battery 62 is computed using the initial remaining battery level SOC22 (0). The computed remaining battery level SOC22 is input to the remote controller ECU 70.

The remote controller ECU 70 is configured or programmed to control the first switch 91 in the same manner as in the first preferred embodiment based on the remaining level SOC11 of the first propulsion device battery 51 and the remaining battery levels SOC21, SOC22 of the first accessory battery 61 and/or the second accessory battery 62 (see FIG. 2). The remote controller ECU 70 is also configured or programmed to control the second switch 92 in the same manner as in the first preferred embodiment based on the remaining battery level SOC12 of the second propulsion device battery 52 and the remaining battery levels SOC21, SOC22 of the first accessory battery 61 and/or the second accessory battery 62 (see FIG. 2).

The remote controller ECU 70 is further configured or programmed to turn the third switch 93 on when the main switch 5 is turned on, while turning the third switch 93 off when the main switch 5 is turned off.

Accordingly, when the main switch 5 is turned off, all of the first, second, and third switches 91, 92, 93 are turned off. This causes the parallel connection between the first and second propulsion device batteries 51, 52 to be terminated and the parallel connection of the first and second accessory batteries 61, 62 with respect thereto to be also terminated. Then, the parallel connection between the first and second accessory batteries 61, 62 is also terminated. This causes the first and second propulsion device batteries 51, 52 and the first and second accessory batteries 61, 62 to be not under load and not to be connected to any other battery. It is therefore possible for the OCV sensors 111, 121 to detect the open circuit voltages OCV11, OCV12 of the first and second propulsion device batteries 51, 52 accurately. It is also possible for the OCV sensors 211, 221 to detect the open circuit voltages OCV21, OCV22 of the first and second accessory batteries 61, 62 accurately. Accordingly, the remaining battery levels SOC11, SOC12, SOC21, SOC22 of the first and second propulsion device batteries 51, 52 and the first and second accessory batteries 61, 62 are obtained accurately, such that the charge control, etc., for the batteries is performed adequately.

While preferred embodiments of the present invention have been described above, the present invention may be embodied in other forms as exemplarily listed below.

The switches 91 to 93, 100, which are controlled preferably by the remote controller ECU 70 in the above-described preferred embodiments, may be controlled by another switch controller. For example, the engine ECU 30 may control the switches 91 to 93, 100 or a controller other than the remote controller ECU 70 and the engine ECU 30 may control the switches 91 to 93, 100.

The remaining battery level-based control is not limited to the above-described examples. For example, while the main switch is on and the engine stops, the engine may be controlled to start in response to a decrease in the remaining battery level to charge the battery.

Instead of the dedicated battery remaining level computing processors 113, 123, 213, 223 that compute remaining battery levels, the remote controller ECU 70 or the engine ECU 30 may similarly compute remaining battery levels.

The propulsion devices may not be limited to outboard motors but may include inboard motors, inboard-outboard motors, and waterjets.

The present application claims priority to Japanese Patent Application No. 2016-079850 filed in the Japan Patent Office on Apr. 12, 2016, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel power supply system for a vessel including a propulsion device that includes an engine and a generator driven by the engine to generate electricity, the vessel power supply system comprising:
   a first battery that supplies power to the propulsion device;
   a second battery that supplies power to accessories of the vessel;
   a first open circuit voltage sensor that detects an open circuit voltage of the first battery;
   a second open circuit voltage sensor that detects an open circuit voltage of the second battery;
   a first switch that is turned on/off to open and close a current path between the first battery and the second battery; and
   an on/off switch disposed in a power line that connects the propulsion device to the first battery, the on/off switch including a first end connected to the first battery and a second end connected to the propulsion device; wherein
   the first switch is disposed in a current path between the second battery and the first end of the on/off switch such that the second battery is connected to the propulsion device via the power line in parallel with the first battery when the on/off switch and the first switch are both on, and that the second battery is disconnected from the propulsion device when either the on/off switch or the first switch is off.

2. The vessel power supply system according to claim 1, wherein
   the second battery is connected to the propulsion device via the current path; and
   when the first switch is turned on/off, the second battery is connected to/disconnected from the propulsion device.

3. The vessel power supply system according to claim 1, further comprising a switch controller configured or programmed to control the first switch.

4. The vessel power supply system according to claim 3, further comprising a main switch that is able to supply power to the propulsion device and to be turned off by the user to stop supplying power to the propulsion device; wherein
   the switch controller is configured or programmed to turn the first switch off when the main switch is turned off.

5. The vessel power supply system according to claim 4, further comprising a start determining processor configured or programmed to determine whether the engine of the propulsion device has started; wherein the switch controller is configured or programmed to turn the first switch on when the main switch is turned on and the start determining processor determines that the engine has started.

6. The vessel power supply system according to claim 5, wherein the start determining processor is configured or programmed to determine whether the engine has started based on a rotational speed of the engine or a circuit voltage within the propulsion device.

7. The vessel power supply system according to claim 1, further comprising:
   a first storage that stores a first open circuit voltage value detected by the first open circuit voltage sensor when the first switch is in an off state; and
   a second storage that stores a second open circuit voltage value detected by the second open circuit voltage sensor when the first switch is in an off state.

8. The vessel power supply system according to claim 7, further comprising:
   a first battery remaining level calculator that calculates a first battery remaining level of the first battery based on the first open circuit voltage value stored in the first storage and an integrated value of a current flowing into/out of the first battery; and
   a second battery remaining level calculator that calculates a second battery remaining level of the second battery based on the second open circuit voltage value stored in the second storage and an integrated value of a current flowing into/out of the second battery.

9. The vessel power supply system according to claim 8, further comprising a charging circuit that charges the first battery and the second battery with electric power generated by the generator; wherein
   when the first switch is on and the first battery remaining level calculated by the first battery remaining level calculator becomes lower than a first threshold value, the first switch is turned off.

10. The vessel power supply system according to claim 9, wherein, when the first switch is off and the first battery remaining level calculated by the first battery remaining level calculator exceeds a second threshold value that is equal to or higher than the first threshold value, the first switch is turned on.

11. The vessel power supply system according to claim 9, further comprising a charge limiter that limits charging by the charging circuit when the first battery remaining level calculated by the first battery remaining level calculator is equal to or higher than a third threshold value that is equal to or higher than the first threshold value and the second battery remaining level calculated by the second battery remaining level calculator is equal to or higher than a fourth threshold value.

\* \* \* \* \*